(12) United States Patent  (10) Patent No.: US 9,191,531 B2
Shigenobu  (45) Date of Patent: Nov. 17, 2015

(54) DISPLAY INPUT DEVICE THAT DISPLAYS NAVIGATION SCREENS FOR ASSISTING IN USER CREATION OF WORKFLOWS, IMAGE FORMING APPARATUS INCORPORATING SUCH DISPLAY INPUT DEVICE, AND DISPLAY METHOD OF USING SUCH DISPLAY INPUT DEVICE

(75) Inventor: Dai Shigenobu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 885 days.

(21) Appl. No.: 13/004,218

(22) Filed: Jan. 11, 2011

(65) Prior Publication Data

US 2011/0194144 A1    Aug. 11, 2011

(30) Foreign Application Priority Data

Feb. 5, 2010   (JP) ................................ 2010-023681

(51) Int. Cl.
*G06F 3/0482* (2013.01)
*H04N 1/00* (2006.01)
*G06F 3/12* (2006.01)

(52) U.S. Cl.
CPC ....... *H04N 1/00416* (2013.01); *H04N 1/00411* (2013.01); *H04N 1/00424* (2013.01); *H04N 1/00427* (2013.01); *H04N 1/00432* (2013.01); *H04N 1/00435* (2013.01); *H04N 1/00474* (2013.01); *H04N 1/00482* (2013.01); *G06F 3/1208* (2013.01); *G06F 3/1253* (2013.01); *G06F 3/1257* (2013.01); *G06F 3/1279* (2013.01); *H04N 2201/0094* (2013.01)

(58) Field of Classification Search
CPC .................................................. G06F 3/0482

USPC .................................. 715/764, 819, 820, 855
See application file for complete search history.

(56) References Cited

U.S. PATENT DOCUMENTS

| 6,654,037 B1 * | 11/2003 | Garcia et al. ................... 715/802 |
| 2002/0136563 A1 * | 9/2002 | Maeda et al. .................... 399/81 |
| 2004/0254465 A1 * | 12/2004 | Sano et al. ..................... 600/443 |
| 2007/0139707 A1 * | 6/2007 | Takami et al. ............... 358/1.15 |
| 2009/0037839 A1 * | 2/2009 | Shigenobu .................... 715/781 |

FOREIGN PATENT DOCUMENTS

| JP | 11-203118 | 7/1999 |
| JP | 2006-11733 | 1/2006 |
| JP | 2006-236142 | 9/2006 |

OTHER PUBLICATIONS

Dan Appleman, Free tax return software reviewed: TurboTax vs. TaxCut vs. TaxAct, Feb. 2, 2009, examiner.com, pp. 1-3, http://www.examiner.com/article/free-tax-return-software-reviewed-turbotax-vs-taxcut-vs-taxact.*

* cited by examiner

*Primary Examiner* — Jennifer To
*Assistant Examiner* — Terri Filosi
(74) *Attorney, Agent, or Firm* — Smith, Gambrell & Russell LLP

(57) ABSTRACT

A display input device includes a storage unit which stores a program for controlling to display a screen for setting a set item that is selected and registered in advance by calling, an input unit which accepts a setting input, and a display unit which displays a combination image in which a position display image for indicating a current position of the display in the program when the program is called, and a screen number display image indicating the number of setting screens that are displayed or have been displayed for setting the set item included in the program are combined, for each set item included in the program, arranged in the display order of the set item in the program.

17 Claims, 12 Drawing Sheets

DISPLAY INPUT DEVICE THAT DISPLAYS NAVIGATION SCREENS FOR ASSISTING IN USER CREATION OF WORKFLOWS, IMAGE FORMING APPARATUS INCORPORATING SUCH DISPLAY INPUT DEVICE, AND DISPLAY METHOD OF USING SUCH DISPLAY INPUT DEVICE

This application is based upon and claims the benefit of priority from the corresponding Japanese Patent Application No. 2010-023681 filed on Feb. 5, 2010, the entire contents of which are incorporated herein by reference.

BACKGROUND OF THE INVENTION

1. Field of the Invention

The present invention relates to a display input device including a display unit and an input unit such as a touch panel. The present invention also relates to an image forming apparatus with the display input device, such as a copier, a multifunction peripheral, a printer, or a fax machine.

2. Description of Related Art

For instance, an image forming apparatus such as a copier or a multifunction peripheral is equipped with many functions (e.g., scaling, aggregate print, two-sided print, and the like). The image forming apparatus may be equipped with a display input device having a screen with a liquid crystal display unit and a touch panel so as to select easily a function to be used among the many functions (set items). In addition, for example, a personal computer usually includes an input device such as a keyboard and a mouse, and a display device such as a monitor, so that many processes can be performed by using application software or the like.

Here, there is a limitation in the size of the liquid crystal display unit or the display, so that only limited information can be displayed in one screen. Therefore, in a computer, for example, a plurality of pages of data are arranged, and the pages are changed for viewing the contents (e.g., electronic document file). For instance, as to a computer, there is known a positional information display program for displaying positional information with respect to the entire electronic data, including a step for an electronic data processing unit to perform a predetermined process on the basis of unit data, a step for a link spot graph display unit to display a link spot graph in which a plurality of link spots associated with a plurality of unit data have the same arrangement as the electronic data, a step for a mark position deciding unit to decide a mark position that is a display position of the link spot corresponding to the unit data specified as a mark target, and a step for a mark display unit to display a mark at the mark position. This program is aimed at informing a position of noted unit data easily with respect to the entire electronic data.

Here, in a screen display of an operation panel of the image forming apparatus, set items to be displayed and the sequence thereof are registered as a program in advance. Then, when the program is called, setting screens for the preselected set items are sequentially displayed in the order of the set items included in the program so as to set the same. Thus, predetermined set items can be set easily.

When this program is called, it is preferable that a position of the current setting screen with respect to the entire program and the progress thereof can be grasped. Therefore, it is considered to display one image indicating a setting screen (e.g., icon that corresponds to the link spot in the conventional method) that is displayed until the setting is finished, for one setting screen, so as to be arranged on the operation panel of the image forming apparatus. However, a display area of the operation panel of the image forming apparatus is smaller than a display area of the computer display. Therefore, there can be problems in that all the icons cannot be displayed, or that a size of the icon is too small if all the icons are displayed, or that a ratio of the area of the icons to the entire display area is too large.

In addition, when setting of one set item is performed, a plurality of setting screens may be displayed for the setting. Therefore, it is considered to arrange and display images (e.g., icons) indicating set items on the operation panel not for each setting screen but for one unit of set items in the program in the screen display by the program.

However, the number of setting screens displayed for one set item (function) is different depending on set items. Therefore, even if the icons are display simply for each set item as one unit so as to display to indicate the current position with respect to the icon indicating set items, the progress in setting with the program cannot be grasped. For instance, it is impossible to grasp the entire workload, the number of screens left to be displayed for completion, the number of times of setting set values left, and the like. Therefore, there is a problem that it is difficult to grasp correctly an overview of the program or the current progress of setting in the program.

Here, in the above-mentioned known invention, the unit data corresponding to the link spot is each data obtained by dividing the electronic data arbitrarily. Usually, sizes of the unit data are not uniform. For instance, if only a part of the plurality of unit data is peculiarly large, the current position display is not always exact. Therefore, the conventional technique cannot solve the above-mentioned problem.

SUMMARY OF THE INVENTION

An object of the present invention is, in view of the above-mentioned problem of the conventional technique, to provide grasping exactly an overview and a position of current progress when images are arranged and displayed on the basis of a constant unit so as to indicate a current position in the entire workload.

In order to achieve the above-mentioned object, a display input device according to an aspect of the present invention includes a storage unit which stores a program for controlling to display a screen for setting a set item that is selected and registered in advance by calling, which is a combination of set items selected and registered in advance from a plurality of set items, and an input unit which accepts a call of the program, a setting input performed on the device, and a display unit which displays a plurality of functions that can be performed as set items and which, when the program is called, displays a combination image in which a position display image for indicating whether or not being displayed in the program and indicating a current position, and a screen number display image indicating the number of setting screens that are displayed or have been displayed for setting the set item included in the program are combined, for each set item included in the program, arranged in the display order of the set item in the program.

By using the display input device of the present invention, images are arranged and displayed on the basis of a certain unit, so as to indicate a current position in the whole. Thus, it is possible to grasp an overview in setting by using the program, the current position, and the progress exactly.

Further features and advantages of the present invention will become apparent from the description of embodiments given below.

DETAILED DESCRIPTION OF THE PREFERRED EMBODIMENTS

Hereinafter, an embodiment of the present invention will be described with reference to FIGS. 1 to 12. Here, in this description, an operation panel 1 (corresponding to the display input device) is exemplified, and the case where the operation panel 1 is attached to a multifunction peripheral 100 (corresponding to the image forming apparatus) will be described as an example. Note that the present invention can be applied to various display input devices, and the structure, arrangement, and other elements described in this embodiment are merely examples for description, which should be interpreted not to limit the scope of the present invention.

(Outline of the Image Forming Apparatus)

Figure 1:
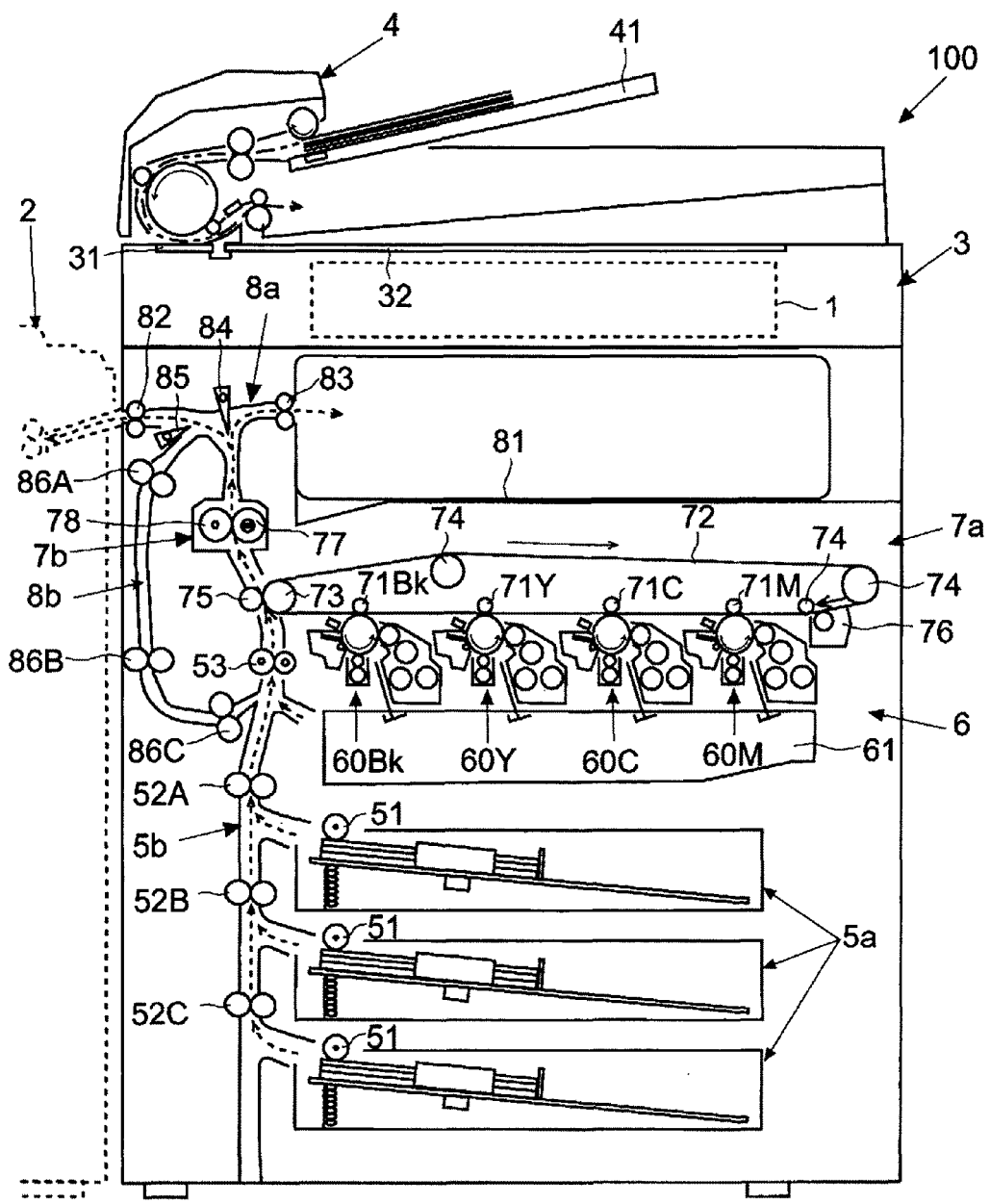
FIG. 1 is a front schematic cross sectional view illustrating an example of a multifunction peripheral according to an embodiment of the present invention.
Figure 2:
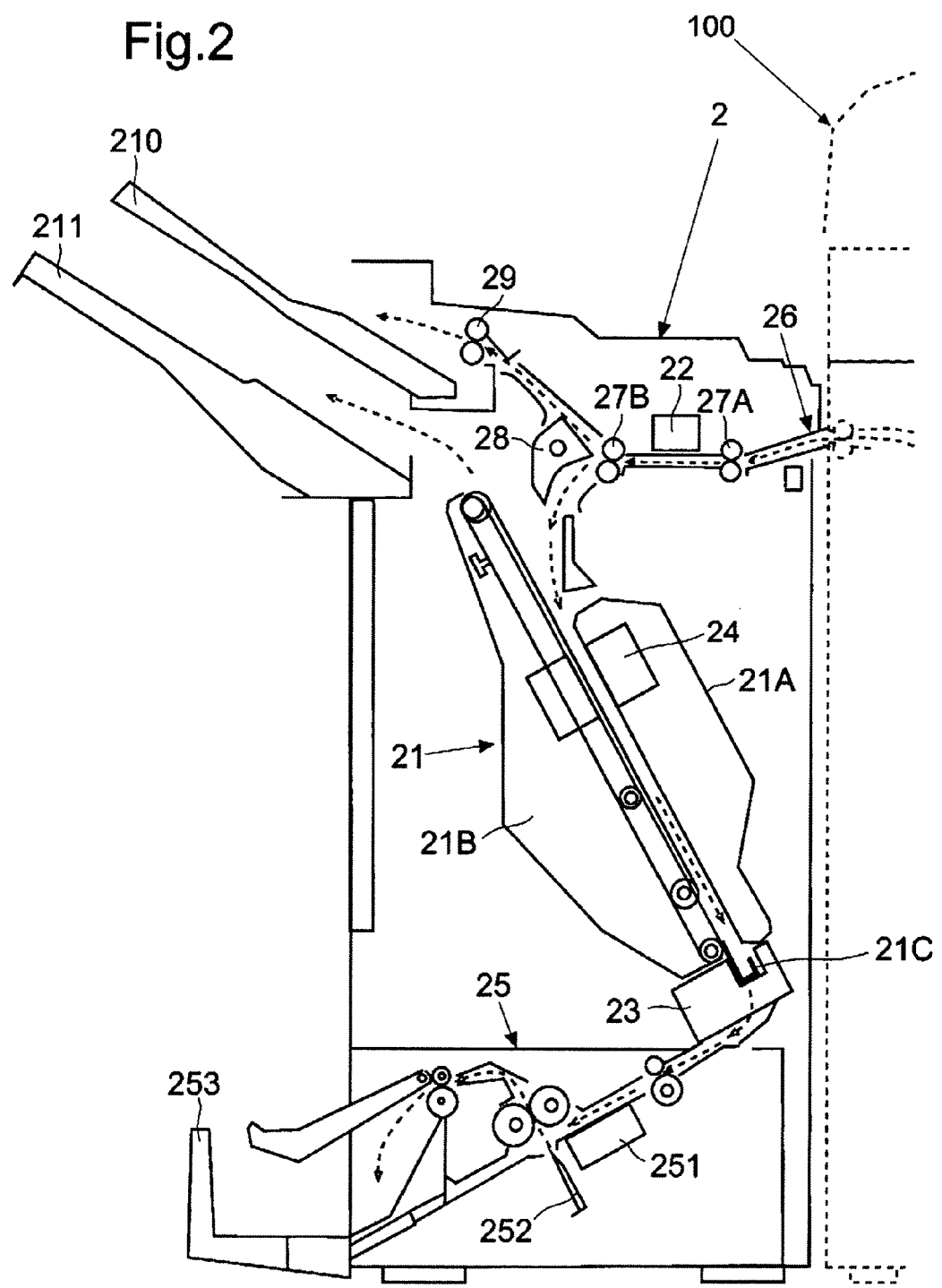
FIG. 2 is a front schematic cross sectional view illustrating an example of a post-processing device according to the embodiment.

First, with reference to FIGS. 1 and 2, an outline of the multifunction peripheral 100 according to the embodiment of the present invention will be described. FIG. 1 is a front schematic cross sectional view illustrating an example of the multifunction peripheral 100 according to the embodiment of the present invention. FIG. 2 is a front schematic cross sectional view illustrating an example of a post-processing device 2 according to the embodiment of the present invention.

As illustrated in FIG. 2, the multifunction peripheral 100 of this embodiment includes the post-processing device 2 as an optional device attached to left side thereof. The post-processing device 2 takes in sheets after being printed by the multifunction peripheral 100, and performs various processing such as a stapling process. In addition, the operation panel 1 to perform various setting for the multifunction peripheral 100 is provided to the front of the multifunction peripheral 100 (which will be described later in detail).

As illustrated in FIG. 1, an image reader unit 3 and a document feeding device 4 are provided to the upper part of the multifunction peripheral 100 according to this embodiment. The multifunction peripheral 100 includes a paper sheet feeder 5a, a transport path 5b, an image forming unit 6, an intermediate transferring unit 7a, a fixing unit 7b, a delivery conveyor unit 8a, a two-sided transport path 8b, and the like inside a main body.

The document feeding device 4 includes a document tray 41 on which a document to be read is placed. Then, the document feeding device 4 feeds the document from the document tray 41 to a read position (contact glass for feed reading 31) one by one sheet automatically and successively. In addition, the document feeding device 4 is attached to the image reader unit 3 in an openable and closable manner in the up and down direction about rear side of the paper in FIG. 1. The document feeding device 4 works as a cover that presses down contact glasses of the image reader unit 3 (contact glass for feed reading 31 and contact glass for place reading 32) from upside.

Next, the image reader unit 3 includes the contact glass for feed reading 31 and the contact glass for place reading 32 on which a document such as a book is placed when reading the document one by one sheet, on the upper surface as illustrated in FIG. 1. A lamp, a mirror, a lens, an image sensor, and the like (not shown) are disposed inside the image reader unit 3. The image sensor reads the document passing on the contact glass for feed reading 31 or the document placed on the contact glass for place reading 32 on the basis of reflection light from the document. Then, the image sensor converts the reflection light into an analog electric signal corresponding to image density. After that, quantization is performed so as to obtain image data of the document. Note that the image reader unit 3 of this embodiment can read in color or monochrome.

A plurality of paper sheet feeders 5a in the main body of the multifunction peripheral 100 store respective sizes (e.g., letter size, legal, A-type such as A4 and B-type such as B4) of various paper sheets (e.g., copy paper, recycled paper, cardboard, OHP sheets, and the like). Each of the paper sheet feeders 5a has a paper feed roller 51 that is driven to rotate. The paper sheet feeder 5a feeds paper sheets one by one to the transport path 5b when printing is performed.

The transport path 5b is a path for conveying paper sheets from the paper sheet feeder 5a to the image forming unit 6 in the apparatus. Further, guide plates for guiding paper sheets, transport roller pairs 52 (three pairs 52A, 52B and 52C from upper side in FIG. 3) that are driven to rotate when paper sheets are conveyed, and a resist roller pair 53 that holds the conveyed paper sheet to wait before the image forming unit 6 and feeds out the same in synchronization with transfer timing of a formed toner image are disposed in the transport path 5b.

The image forming unit 6 includes a plurality of image forming units 60 (60Bk for black color, 60Y for yellow color, 60C for cyan color, and 60M for magenta color), and an exposure device 61. The exposure device 61 outputs a laser beam while turning on and off the same on the basis of image data read by the image reader unit 3 or image data stored in a storage device 92 that will be described later, so as to scan and expose each of photosensitive drum. Each of the image forming units 60 includes the photosensitive drum supported in a rotatable manner, and an electrifying device, a developing device, a cleaning device, and the like that are disposed around the photosensitive drum. Then, each of the image forming units 60 and the exposure device 61 form a toner image on the circumferential surface of the photosensitive drum.

The intermediate transferring unit 7a receives a primary-transferred toner image from each of the image forming units 60 and performs secondary transferring. The intermediate transferring unit 7a is constituted of primary transferring rollers 71Bk to 71M, an intermediate transferring belt 72, a drive roller 73, a plurality of idler rollers 74, a secondary transferring roller 75, a belt cleaning device 76, and the like. Each of the primary transferring rollers 71Bk to 71M and the corresponding photosensitive drum sandwich the endless intermediate transferring belt 72. Each of the primary transferring rollers 71Bk to 71M is supplied with a transferring voltage, so that the toner image is transferred to the intermediate transferring belt 72.

The intermediate transferring belt 72 is wound and stretched around the drive roller 73 and the like. The intermediate transferring belt 72 is driven to turn by rotation of the drive roller 73 that is connected to a drive mechanism such as a motor (not shown). In addition, the drive roller 73 and the secondary transferring roller 75 sandwich the intermediate transferring belt 72. The toner images (of black, yellow, cyan, magenta colors) formed in the individual image forming units 60 are sequentially superposed precisely so as to be transferred onto the intermediate transferring belt 72 as primary transferring. After that, the toner image is transferred onto a sheet by the secondary transferring roller 75 to which a predetermined voltage is applied.

The fixing unit 7b fixes the toner image that is transferred onto the paper sheet. The fixing unit 7b includes a heating roller 77 in which a heating element is embedded, and a press roller 78 that presses the heating roller 77. Then, the paper sheet passes through a nip between the heating roller 77 and the press roller 78. Thus, the toner is melted and heated so that the toner image is fixed onto the paper sheet. The paper sheet delivered from the fixing unit 7b is conveyed to a delivery tray 81 or the post-processing device 2.

The delivery conveyor unit 8a sorts printed paper sheets into paper sheet conveying directions of the post-processing device 2, the delivery tray 81, and the two-sided transport path 8b. Further, the delivery conveyor unit 8a includes a delivery roller pair 82 that delivers the paper sheet to the post-processing device 2, and a delivery roller pair 83 that delivers the paper sheet to the delivery tray 81 or reverses to perform switchback for two-sided print. The delivery roller pairs 82 and 83 are driven to rotate. In addition, the delivery conveyor unit 8a includes two switch valves 84 and 85, for example, so as to switch conveying directions of the paper sheet. Each of the switch valves 84 and 85 swings to lead the paper to the delivery destination specified by the operation panel 1 or the like or to lead the paper sheet one side of which is printed to the two-sided transport path 8b when the two-sided print is performed.

The two-sided transport path 8b connects the downstream side of the fixing unit 7b with the upstream side of the resist roller pair 53. A plurality of two-sided transport roller pairs 86 (three pairs 86A, 86B and 86C) that are driven to rotate are disposed in the two-sided transport path 8b for the two-sided print, so that the paper sheet one side of which is printed is conveyed.

On the other hand, as illustrated in FIG. 2, the post-processing device 2 is provided with a stack unit 21 which temporarily stores a bunch of paper sheets, a punch unit 22 which performs a punching process, a staple unit 23 which performs a stapling process on the bunch of paper sheets in the stack unit 21 (stapling the leading end side of the paper sheets viewed from the stack direction), a staple unit 24 (stapling the trailing end side of the paper sheets), a folding unit 25, and the like. The stack unit 21 performs a process of stacking a plurality of paper sheets to be a bunch. The folding unit 25 includes a saddle staple unit 251, and the bunch of paper sheets that is saddle-stapled by the saddle staple unit 251 is folded at the center thereof along the staples.

Specifically, processes in the post-processing device 2 will be described. First, the printed paper sheet delivered from the multifunction peripheral 100 to the post-processing device 2 passes through an inlet 26 disposed on a side surface of the post-processing device 2 and is conveyed to the inside of the post-processing device 2. The punch unit 22 is disposed on the downstream of the inlet 26. The punch unit 22 performs the punching process on the paper sheet.

Further, transport roller pairs 27A and 27B which is driven to rotate for conveying the paper sheet, and a guide nail 28 which swings in accordance with destinations of the paper sheet are disposed on the downstream of the punch unit 22. When selection of performing the stapling process or the like is made by an input to the operation panel 1 or the like, the guide nail 28 swings so as to send the paper sheet to the stack unit 21 below the guide nail 28. As a result, the paper sheet is conveyed to the stack unit 21. Further, when the folding process is performed, the paper sheets after being stacked in the stack unit 21 are conveyed to the folding unit 25 that is disposed further below.

On the other hand, when selection of performing the punching process or the stapling process is not made (i.e., when the post-processing device 2 does not perform any process), or when the delivery destination is set to a sub delivery tray 210 by the operation panel 1, the guide nail 28 swings so as to send the paper sheet to a delivery roller pair 29 above the guide nail 28, for example. As a result, the paper sheet is delivered to the sub delivery tray 210 from the delivery roller pair 29.

The stack unit 21 is constituted of a cover tray 21A and a stack tray 21B. Then, the conveyed paper sheet is sent to the space between the cover tray 21A and the stack tray 21B. The paper sheets are stacked on the upper surface of the stack tray 21B. The cover tray 21A works as a cover pressing the bunch of paper sheets from above. The stack tray 21B has a stopper 21C that receives the conveyed paper sheet. The stopper 21C moves up and down so as to convey the stacked bunch of paper sheets upward or downward.

Further, there is provided the staple unit 23 that staples the leading end side of the paper sheets (lower side of the stacked paper sheets) and the staple unit 24 that staples the trailing end side of the paper sheets (upper side of the stacked paper sheet) accompanying the stack unit 21. The staple units 23 and 24 performs so-called oblique staple in which one of leading corners of the bunch of paper sheets is stapled with a staple slanted at 45 degrees. Then, the stack unit 21 conveys the bunch of paper sheets after the stapling process or the like upward and delivers the same to a main delivery tray 211.

The folding unit 25 is disposed below the stack unit 21. When the folding process is selected by input to the operation panel 1, the bunch of paper sheets that is once stacked in the stack unit 21 is conveyed toward the folding unit 25. The saddle staple unit 251 can perform center stapling, in which the bunch of paper sheets are stapled with two staples, for example, along the short side direction at the center of the longitudinal direction. The center stapled bunch of paper sheets is folded by a protruding rod 252 of the folding unit 25 and is delivered to a booklet tray 253.

(Operation Panel 1)

Figure 3:
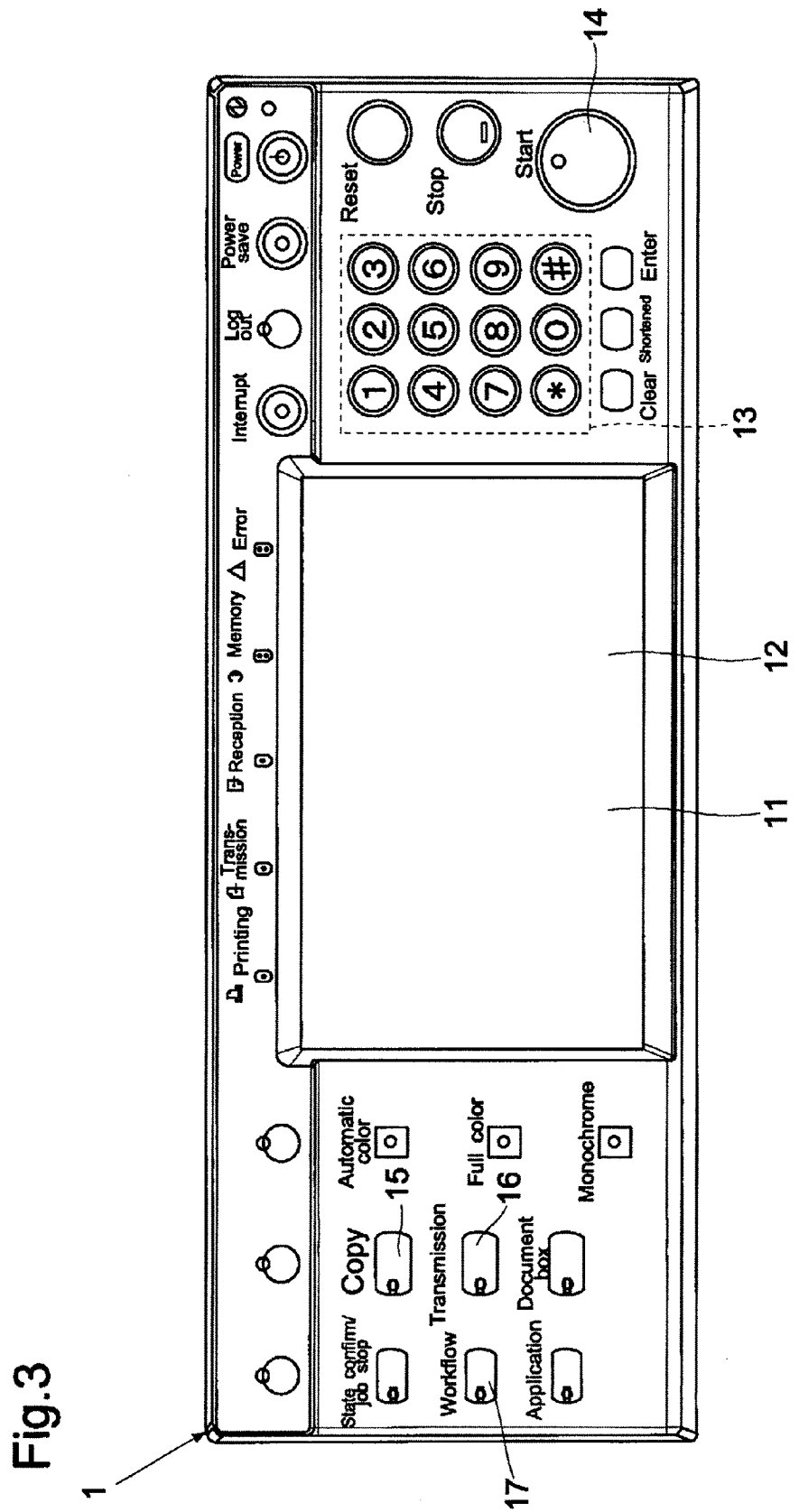
FIG. 3 is a plan view illustrating an example of an operation panel according to the embodiment.

Next, with reference to FIG. 3, an example of the operation panel 1 according to the embodiment of the present invention will be described. FIG. 3 is a plan view illustrating an example of the operation panel 1 according to the embodiment of the present invention.

The operation panel 1 is disposed at the upper part of the front surface of the multifunction peripheral 100 as illustrated in FIGS. 1 and 3. Further, the operation panel 1 includes a liquid crystal display unit 11 (corresponding to the display unit) that displays menus and keys (see FIG. 5 and others) for setting or instructing operations for the multifunction peripheral 100 and the post-processing device 2, and various images and screens of status messages and the like of the multifunction peripheral 100 and the like. A user presses a key displayed on the liquid crystal display unit 11 so as to perform various setting for the multifunction peripheral 100 and setting or instructing operations for the post-processing device 2. For instance, the user can instruct the post-processing device 2 to perform the stapling process or can set and input the delivery destination of paper sheets.

In addition, a touch panel unit 12 (corresponding to the input unit) is disposed on the upper surface of the liquid crystal display unit 11. The touch panel unit 12 detects the position or coordinates of the point where the user presses on the liquid crystal display unit 11. The coordinates detected by the touch panel unit 12 are compared with the position or coordinates of various keys displayed on the liquid crystal display unit 11, so that the key pressed and selected by the user is specified. Note that the touch panel unit 12 may utilize various types such as a resistor film type, a surface acoustic wave type, an infrared type, a capacitance type, and the like without specific limitation.

In addition, the operation panel 1 includes following hardware keys (buttons). For instance, a ten-key unit 13 (corresponding to the input unit) for numeric input, a start key 14 (corresponding to the input unit) for instructing to start a process such as copying after various setting, and the like are disposed. In addition, a copy key 15 (corresponding to the input unit) that is pressed when a copy function is used, a transmission key 16 (corresponding to the input unit) that is pressed when a scanner function or a fax function is used, and the like are disposed. In addition, a workflow key 17 (corresponding to the input unit) is also disposed, which is pressed when a workflow is created, registered or called (details will be described later).

In this way, in order to perform various setting, a mode selection and the like for each function of the multifunction peripheral 100, the operation panel 1 is provided with the touch panel unit 12 and the various hardware keys as the input unit.

(Hardware Structure of Multifunction Peripheral 100 or the Like)

Figure 4:
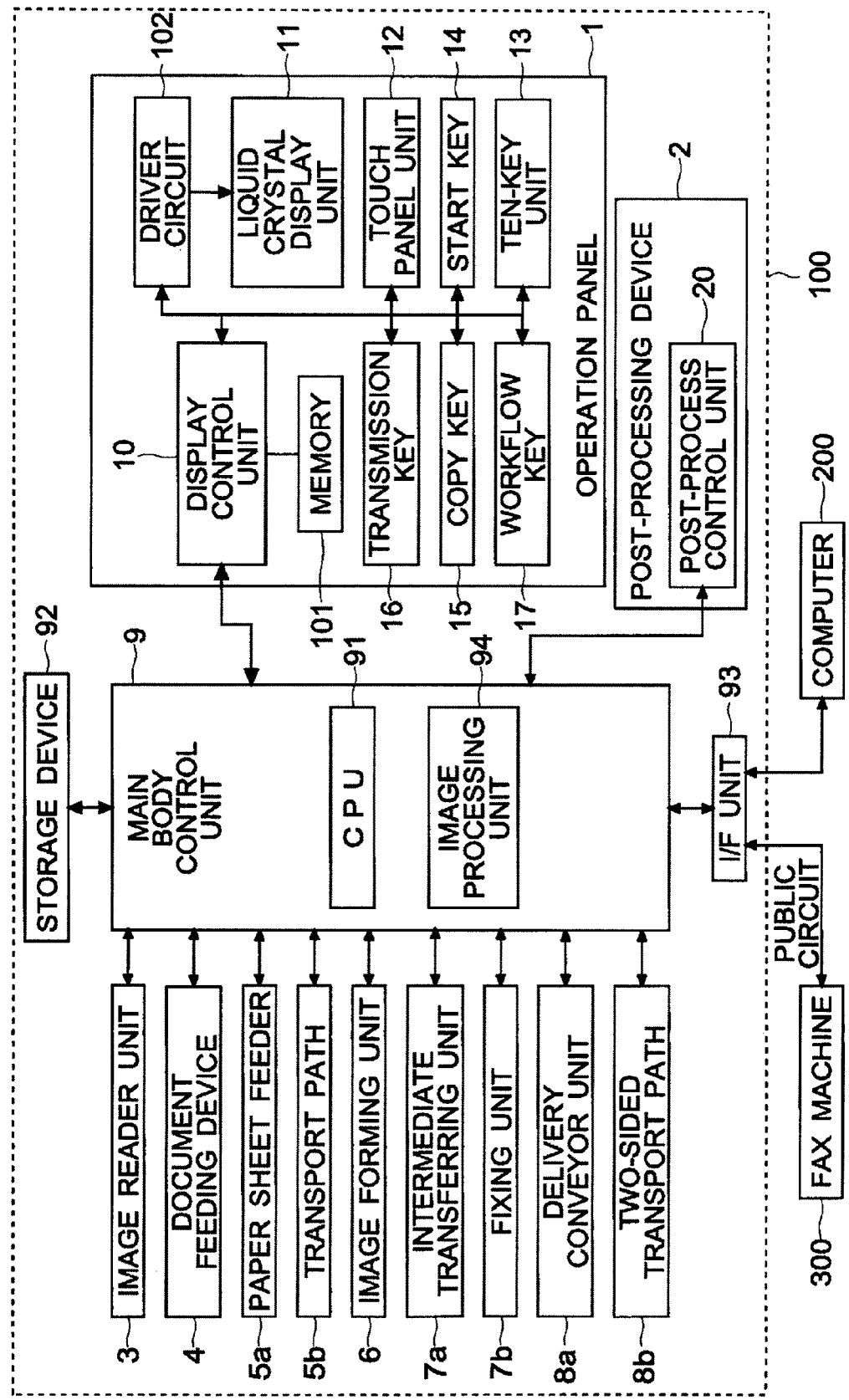
FIG. 4 is a block diagram illustrating an example of a hardware structure of a multifunction peripheral or the like according to the embodiment.

Next, with reference to FIG. 4, an example of a hardware structure of the multifunction peripheral 100 or the like according to the embodiment of the present invention will be described. FIG. 4 is a block diagram illustrating an example of the hardware structure of the multifunction peripheral 100 or the like according to the embodiment of the present invention.

First, a main body of the multifunction peripheral 100 will be described. A main body control unit 9 is disposed inside the main body of the multifunction peripheral 100. The main body control unit 9 is connected to the operation panel 1, the document feeding device 4, the image reader unit 3, the paper sheet feeder 5a, the transport path 5b, the image forming unit 6, the fixing unit 7b, the delivery conveyor unit 8a, and the like, for example, so as to control these units.

The main body control unit 9 includes, for example, a control device such as a CPU 91. The CPU 91 controls the individual units of the multifunction peripheral 100 by performing operations and the like on the basis of a control program that is stored in the storage device 92 (corresponding to the storage unit) and is loaded. Note that the main body control unit 9 may be split into units for individual functions (plurality of types), including a main control unit that performs general control and image processing, and an engine control unit that controls image formation and printing by turns on and off a motor and the like for driving various rotation bodies. In this description, a case where these control units are integrated as the main body control unit 9 are shown and described.

The storage device 92 is connected to the main body control unit 9. The storage device 92 is constituted as a combination of a nonvolatile storage device and a volatile storage device, which includes a ROM, a RAM, an HDD, and the like. The storage device 92 can store a control program and various data such as control data, set data, image data, and the like, for the multifunction peripheral 100. In addition, concerning the present invention, the storage device 92 can store a created workflow (corresponding to the program). Note that the workflow means a combination of registered set items after being selected from a plurality of set items in advance, and it is a program that is called for displaying a screen for setting the set items that are selected and registered in advance, on the display unit (details will be described later).

Further, the main body control unit 9 is connected to an interface unit (hereinafter referred to as I/F unit 93) having various connectors, sockets, a fax modem, and the like. The I/F unit 93 is connected to a plurality of external computers 200 (e.g., personal computers) and a fax machine 300 on the other side via a network, a public line, or the like (each one of them is illustrated in FIG. 7 for convenience sake). For instance, image data obtained by the image reader unit 3 can be stored in the storage device 92, or can be transmitted to the external computer 200 or the fax machine 300 on the other side (scanner function, fax function). In addition, it is also possible to perform printing, fax transmission, or the like on the basis of the image data received from the external computer 200 or the fax machine 300 on the other side and input to the multifunction peripheral 100 (printer function or fax function).

In addition, the main body control unit 9 recognizes inputs from the operation panel 1 and controls the multifunction peripheral 100 so that the copy or the like is performed in accordance with setting by the user. When setting for performing stapling with the post-processing device 2 or setting for delivering to the sub delivery tray 210 is made on the operation panel 1, for example, the main body control unit 9 controls the delivery conveyor unit 8a so that a printed paper sheet is conveyed to the post-processing device 2, and controls the switch valves 84 and 85 to swing. In addition, when the setting for delivering to the delivery tray 81 in the body of the multifunction peripheral 100 is made on the operation panel 1, for example, the main body control unit 9 controls the delivery conveyor unit 8a so that a printed paper sheet is conveyed to the delivery tray 81 in the body, and controls the switch valves 84 and 85 to swing.

In addition, for example, the main body control unit 9 includes an image processing unit 94 that performs image processing on image data obtained by reading a document by the image reader unit 3 or image data input to the multifunction peripheral 100 via the I/F unit 93. The image data processed by the image processing unit 94 is, for example, transmitted to the exposure device 61 and is used for scanning and exposing the photosensitive drum.

In addition, the main body control unit 9 is connected to a post-process control unit 20 that is disposed inside the post-processing device 2 and controls operation of the post-processing device 2, so that communication between them can be performed. For instance, the post-process control unit 20 controls operations of the punch unit 22, the staple units 23 and 24, and the like on the basis of instruction from the main body control unit 9. For instance, the post-process control unit 20 controls rotation of the motor that drives the guide nail 28 to swing. Further, in accordance with an instruction from the main body control unit 9 (e.g., to deliver to the sub delivery tray 210 or the main delivery tray 211, or to convey to the stack unit 21 for the punching process), the post-process control unit 20 controls a motor in the post-processing device 2 to rotate forward or reverse, so as to control a conveying direction of a paper sheet.

The operation panel 1 according to this embodiment includes a display control unit 10, a memory 101 (corresponding to the storage unit), a driver circuit 102, the liquid crystal display unit 11, and the touch panel unit 12. The display control unit 10 is constituted of a CPU, an IC, and the like, so as to control the display of the liquid crystal display unit. In addition, the display control unit 10 receives an output of the touch panel unit 12 and specifies coordinates of a pressed position on the liquid crystal display unit 11. The data such as a table indicating correspondence between the output of the touch panel unit 12 and the coordinates is stored in the memory 101. The display control unit 10 compares the coordinates of the pressed position with image data on each setting screen DS so as to specify and recognize a key that is selected (pressed) on the setting screen DS.

Specifically, in order to select a set item of each function of the multifunction peripheral 100 and set a set value, setting of keys displayed on the liquid crystal display unit 11 is repeated from a top layer display of the liquid crystal display unit 11. Then, the display control unit 10 controls the liquid crystal display unit 11 to change its display for each key selection so as to set finally a set value of the function to be selected and set. The display control unit 10 recognizes that the function is selected and the set value is set, and transmits the contents thereof to the main body control unit 9. Thus, the main body control unit 9 controls the individual units of the image forming unit 6 or the like to perform an operation in accordance with the function selected and set by the operation panel 1. Thus, user's intention is reflected on the printing or the like (e.g., set density, scaling, or the like).

Further, the image data of screens and images displayed on the liquid crystal display unit 11 are stored, for example, in the memory 101 in the operation panel 1. Therefore, every time when a key in a selection screen DF of a set item or each setting screen DS is pressed, the display control unit 10 reads out image data of the screen to be displayed next from the memory 101.

In addition, the image data of screens and images displayed on the liquid crystal display unit 11 may be stored in the storage device 92 of the main body, for example. In this case, the operation panel 1 receives the image data for displaying on the liquid crystal display unit 11 from the storage device 92 via the main body control unit 9. When receiving the image data, the display control unit 10 instructs the driver circuit 102 that actually controls the display on the liquid crystal screen. Note that it is possible to dispose only the driver circuit 102, the liquid crystal display unit 11, and the touch panel unit 12 in the operation panel 1, so that the structure of the main body control unit 9 (CPU 91 or storage device 92) controls the operation panel.

(Creation and Registration of Workflow)

Figure 5A:
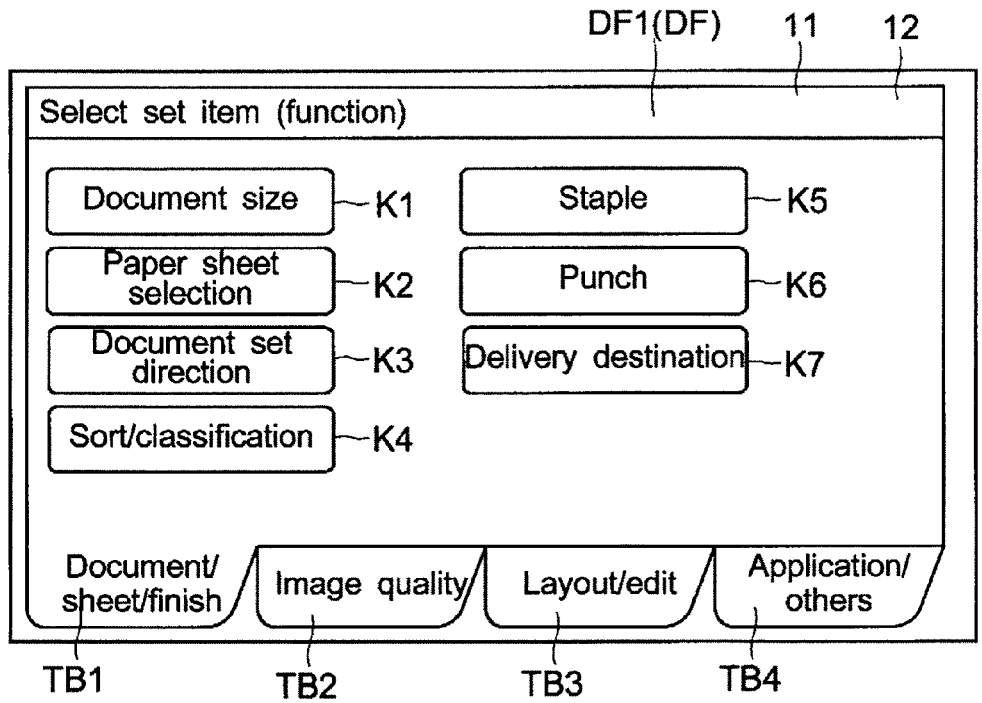
FIGS. 5A and 5B are explanatory diagrams illustrating an example of a selection screen of set items according to the embodiment.
Figure 5B:
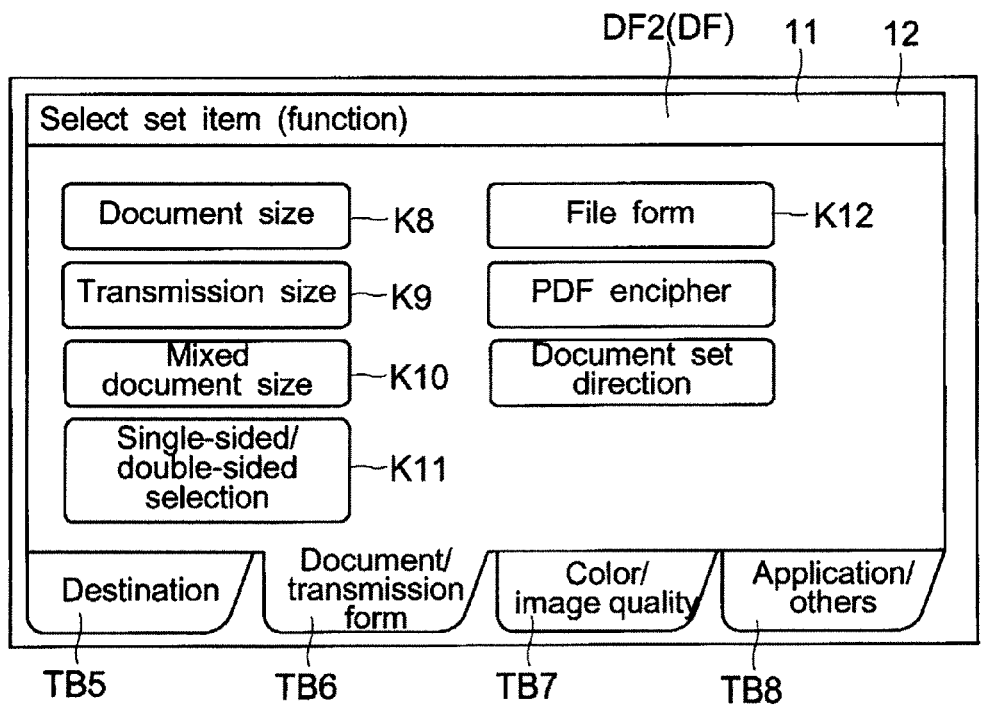
Figure 6:
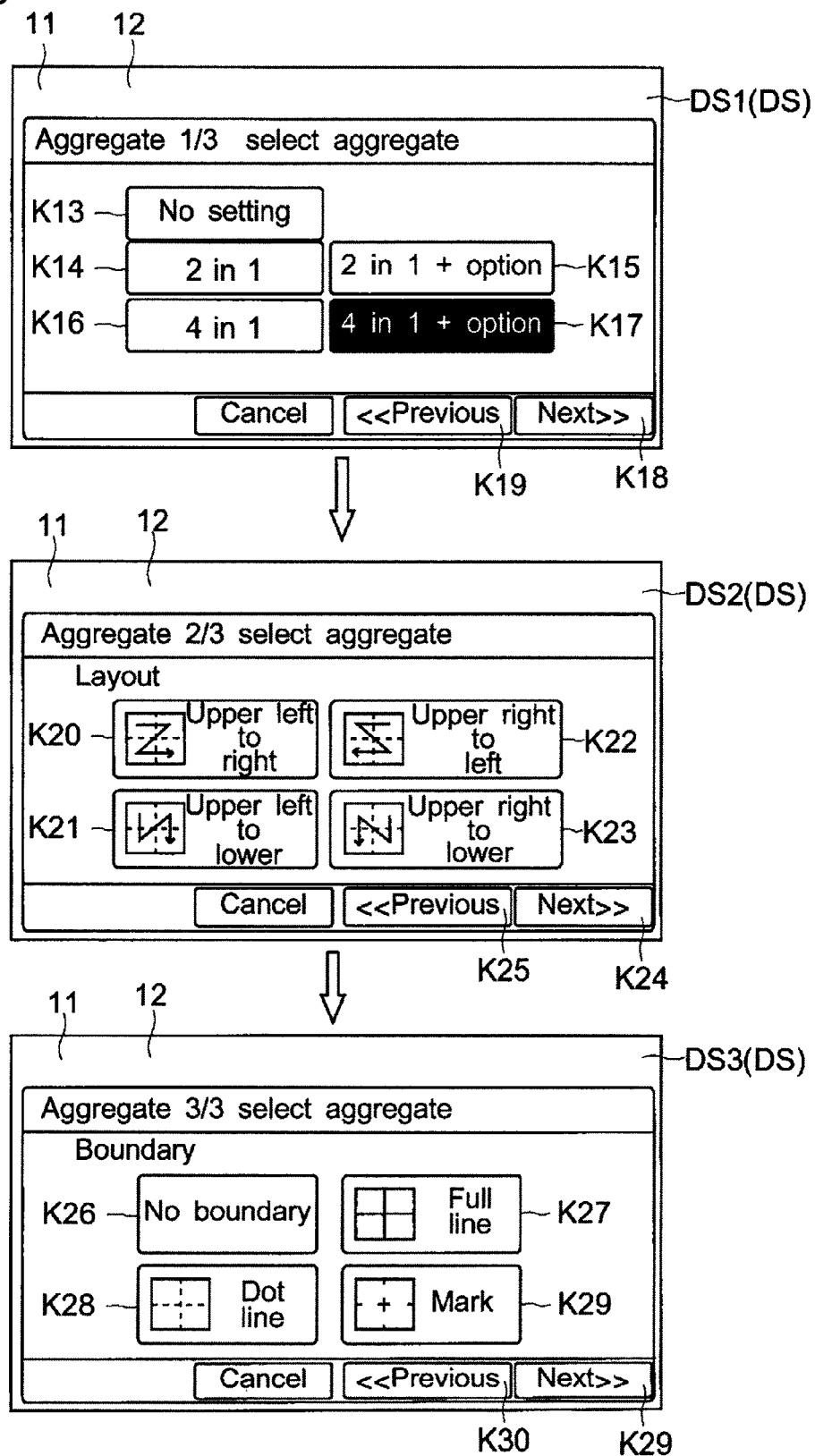
FIG. 6 is an explanatory diagram illustrating an example of a setting screen when a set item for an aggregate function is selected according to the embodiment.
Figure 7A:
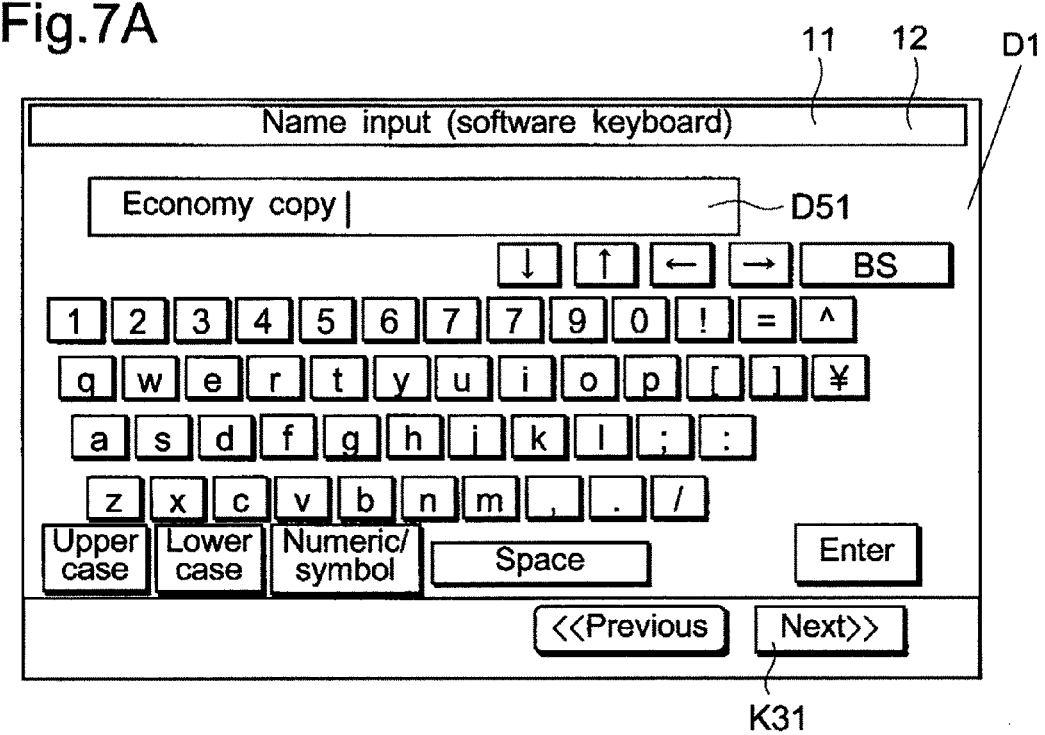
FIG. 7A is an explanatory diagram illustrating an example of a name input screen of a created workflow.
Figure 7B:
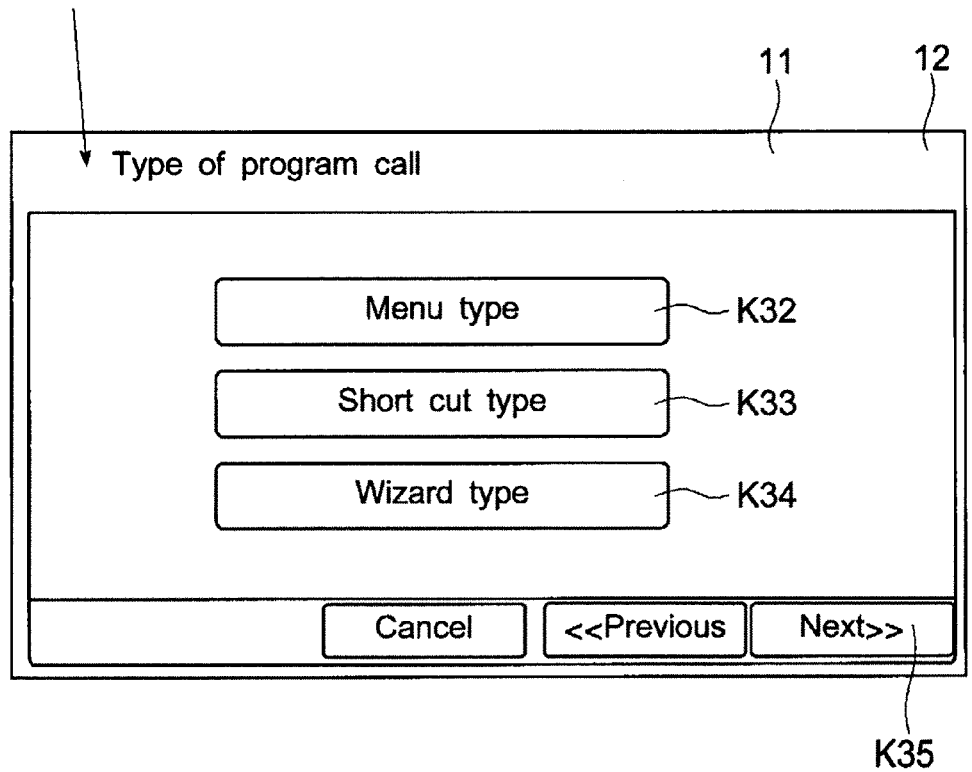
FIG. 7B is an explanatory diagram illustrating an example of a display format determination screen for determining a display format when the workflow is called.

Next, with reference to FIGS. 5 to 8, an outline of creation and registration of the workflow in the multifunction peripheral 100 according to the embodiment of the present invention will be described. FIGS. 5A and 5B are explanatory diagrams illustrating an example of the selection screen DF for set items according to the embodiment of the present invention. FIG. 6 is an explanatory diagram illustrating an example of the setting screen DS when the set item for the aggregate function is selected according to the embodiment of the present invention. FIG. 7A is an explanatory diagram illustrating an example of a name input screen D1 of the created workflow. FIG. 7B is an explanatory diagram illustrating an example of a display format determination screen D2 for determining a display format when calling the workflow.

The multifunction peripheral 100 of this embodiment has many kinds of functions that can be set and various set items. Then, the liquid crystal display unit 11 displays the selection screen DF for selecting the set item among a plurality of set items, and the user selects (presses) the set item (function) that is used for printing and transmission. For instance, the liquid crystal display unit 11 displays the set items as keys. In addition, the liquid crystal display unit 11 displays each setting screen DS for setting the set value of the set item. The user can select and set various functions by pressing keys displayed on each setting screen DS and hardware keys arranged around the liquid crystal display unit 11.

The user sets the set value in each set item by input of each set item displayed on the liquid crystal display unit 11 to the setting screen DS. Here, there are set items that are often combined when the user uses the multifunction peripheral 100. For instance, to reduce consumption of the paper sheet, aggregate and two-sided print are combined in setting, or a method of transmitting image data obtained by reading with the image reader unit 3 and a specific destination of transmission are combined. However, as described above, the multifunction peripheral 100 has many set items (functions) so that it is bothering and inconvenient to set in the same manner every time when using the multifunction peripheral 100.

Therefore, in the multifunction peripheral 100 of this embodiment, a combination of set items that is often used can be selected and created in advance, so that the combination of the set items is stored (registered) as the workflow (corresponding to the program) in the storage unit (storage device 92, memory 101 or the like) (details will be described later). Then, the user calls a workflow stored in the storage device 92 (program including data set items selected in advance, a display order thereof, and a display format thereof), so that screens for setting the set items that are selected in advance are displayed on the liquid crystal display unit 11. Therefore, creation and registration of the workflow will be described as follows.

First, with reference to FIG. 5A, creation and registration of the workflow concerning the copy function will be described. When an instruction to create a workflow concerning the copy function is input to the operation panel 1, a new registration of the workflow concerning the copy function is started. For instance, the workflow key 17 is pressed, and a registration/edit key K36 is pressed in the call screen D3 (see FIG. 8). Further, the copy key 15 is pressed so that a new registration of the workflow is started.

FIG. 5A illustrates an example of a selection screen DF1 of set items included in the workflow concerning the copy function. This selection screen DF1 may be similar to the selection screen DF1 of the set item in the normal copy setting. As illustrated in FIG. 5A, the liquid crystal display unit 11 displays a plurality of tabs in the selection screen DF1, which includes a document/sheet/finish tab TB1, an image quality tab TB2, a layout/edit tab TB3, and an application/others tab TB4. Note that more tabs may be arranged.

For instance, when the document/sheet/finish tab TB1 is pressed, the liquid crystal display unit 11 displays set items concerning document/sheet/finish as illustrated in FIG. 5A. The set items (functions) are arranged as keys. For instance, when the document/sheet/finish tab TB1 is pressed, there are displayed keys, which include a document size key K1 for setting a size of the document to be read, a sheet selection key K2 for setting paper sheets used for printing, a document set direction key K3 for setting a set direction of a document on the contact glass for place reading 32 or a document in the document feeding device 4, a sort/classification key K4 for setting the printing order of pages when a plurality of copies are printed, a staple key K5 for setting the stapling process, a punch key K6 for setting the punch process, and a delivery destination key K7 for setting a delivery destination.

In addition, although not illustrated, when the layout/edit tab TB3 is pressed, set items (keys) concerning pages of the copy and a layout of images are displayed (e.g., scaling, aggregate, two-sided print, and the like). In addition, when the image quality tab TB2 is pressed, the liquid crystal display unit 11 displays set items concerning the image quality (e.g., density setting) as keys. In addition, when the application/others tab TB4 is pressed, the liquid crystal display unit 11 displays practical set items concerning the copy (e.g., mirror image printing, black and white reverse printing, and the like) as keys.

Next, with reference to FIG. 5B, creation and registration of the workflow concerning the transmission function (image data transmission as a scanner to a computer or a storage unit, or fax transmission) will be described. When the instruction to create the workflow concerning transmission is input to the operation panel 1, a new registration of the workflow concerning transmission is started. For instance, the workflow key 17 is pressed, and the registration/edit key K36 (see FIG. 8) is pressed in the call screen D3. Then, the transmission key 16 is pressed so that a new registration of the workflow concerning transmission is started.

FIG. 5B illustrates an example of a selection screen DF2 of set items included in the workflow concerning the transmission function (image data transmission as a scanner to a computer or a storage unit, or fax transmission). This selection screen DF2 may also be similar to the selection screen DF of set items when setting the normal transmission. For instance, as illustrated in FIG. 5B, the liquid crystal display unit 11 displays a plurality of tabs including a destination tab TB5, a document/transmission form tab TB6, a color/image quality tab TB7, an application/others tab TB8 in the selection screen DF2 for transmission. Note that more tabs may be arranged.

For instance, the set items are arranged as keys for transmission, too. For instance, as illustrated in FIG. 5B, when the document/transmission form tab TB6 is pressed, set items concerning the document to be read and a transmission form of image data are displayed. For instance, the liquid crystal display unit 11 displays a document size key K8 for setting a size of the document to be read, a transmission size key K9 for setting a size of image data to be transmitted, a mixed document size key K10 for setting whether or not to detect automatically sizes of document sheets set in the document feeding device 4 when they are not the same, a single-sided/double-sided key K11 for setting whether the document is single side printed or double side printed and the number of pages included in image data for one page, a file form key K12 for setting a form (e.g., PDF or TIFF) of image data to be transmitted (set contents are assigned also to keys of other set items, but description thereof are omitted).

In addition, although not illustrated, when the destination tab TB5 is pressed, the set items concerning destination of the image data obtained by reading with the image reader unit 3 and the setting screen DS are displayed (e.g., distinction between transmission methods, an address book, and the like). In addition, when the color/image quality tab TB7 is pressed, the liquid crystal display unit 11 displays set items corresponding to set items concerning image quality (e.g., density and color setting such as full color or gray of the transmission image data) as keys. In addition, when the application/others tab TB8 is pressed, the liquid crystal display unit 11 displays practical set items concerning transmission (e.g., frame erase and the like) as keys.

When selecting of the set items is performed in the selection screens DF (DF1, DF2 and the like), the display control unit 10 controls the liquid crystal display unit 11 to display the setting screen DS for setting set values in the selected set item. Note that the setting screen DS when the workflow is created may be the same as that in the normal use of the multifunction peripheral 100. Therefore, an example of the setting screen DS that is displayed when a set item (function) is selected is illustrated in FIG. 6. FIG. 6 illustrates an example of the setting screen DS when set items (functions) for aggregate in the copy process is selected (two, four, or other number of documents are contracted to be in one page).

For instance, in the set items for aggregate, three screens of setting screens DS are prepared. First, in the setting screen DS1 of set items for aggregate illustrated in the uppermost part of FIG. 6, there are arranged keys, which includes, for example, an unset key K13 that is pressed when aggregate is not performed, a 2 in 1 key K14 that is pressed when two documents are arranged in one page for printing in a predetermined direction, a 2 in 1 key K15 that is pressed when two documents are arranged in one page, and additional (optional) setting such as the arrangement direction or the like is performed, a 4 in 1 key K16 that is pressed when four documents are arranged in one page for printing in a predetermined direction, and a 4 in 1 key K17 that is pressed when four documents are arranged in one page, and additional (optional) setting such as the arrangement direction or the like is performed.

Then, when any key is pressed in the setting screen DS1, the display control unit 10 reverses black and white of the pressed key. In addition, a next key K18 and a previous key K19 are arranged in the setting screen DS1. When the next key K18 is pressed in the state where the key concerning the aggregate is pressed (selected) in the setting screen DS1, the display control unit 10 changes the screen display in accordance with the selected key. On the other hand, when the previous key K19 is pressed, the display control unit 10 changes the display to the selection screen DF for set items, for example.

For instance, when the next key K18 is pressed in the state where the unset key K13, the 2 in 1 key K14, and the 4 in 1 key K16 are selected, it is not necessary to decide more set items for the aggregate, so the display should go back to the selection screen DF. On the other hand, when the 2 in 1 key K15 or the 4 in 1 key K17 is pressed, further setting is required. Therefore, for example, the liquid crystal display unit 11 displays a setting screen DS2 illustrated in the middle part of FIG. 6.

The setting screen DS2 illustrated in the middle part of FIG. 6 is a screen that is displayed when the 4 in 1 key K17 is pressed in the setting screen DS1, for deciding an arrangement order of the aggregated pages. Note that similar setting screen DS for 2 in 1 setting is displayed when the next key K18 is pressed in the state where the 2 in 1 key K15 is pressed (illustration is omitted).

An upper left to right key K20, an upper left to lower key K21, an upper right to left key K22, and an upper right to lower key K23 are disposed in the setting screen DS2 for determining the arrangement order of the aggregate pages. When any key is pressed on the setting screen DS2, the display control unit 10 controls to display the pressed key by reversing black and white thereof. In addition, a next key K24 and a previous key K25 are disposed in the setting screen DS2. When the next key K24 is pressed in the state where the key in the setting screen DS2 is pressed (selected), the display control unit 10 changes the display of the liquid crystal display unit 11 to a setting screen DS3 illustrated in the lowermost part of FIG. 6. On the other hand, when the previous key K25 is pressed, the display control unit 10 changes (resets) the display to the setting screen DS1.

A no boundary key K26, a full line key K27, a dot line key K28, and a mark key K28 are arranged in the setting screen DS3 for defining boundary lines between aggregated pages. The no boundary key K26 is pressed when no boundary line is used between the aggregated document pages. The full line key K27 is pressed when a full line is used as the boundary lines between the aggregated document pages. The dot line key K28 is pressed when a dot line is used as the boundary lines between the aggregated document pages. The mark key K28 is pressed when a dot line is used only at corner parts of the boundary lines between aggregate document pages.

Then, when any key is pressed in the setting screen DS3, the display control unit 10 reverses black and white of the pressed key. In addition, a next key K29 and a previous key K30 are disposed in the setting screen DS3. When the next key K29 is pressed in the state where the key concerning the boundary line is pressed (selected) in the setting screen DS3, it is not necessary to decide more set items for the aggregate, so the display control unit 10 controls to display the selection screen DF on the liquid crystal display unit 11. On the other hand, when the previous key K30 is pressed, the display control unit 10 controls the liquid crystal display unit 11 to change (reset) the display to the setting screen DS2.

In this way, the display control unit 10 grasps the set value that is set by the user in each setting screen DS (key indicating the pressed set value) as a default set value when the workflow is called.

After the selection of the set item and the setting of the default set value are repeated, the display control unit 10 confirms whether or not an input for finishing the selection of set items included in the workflow is made. There may be a plurality of types of inputs for finishing the selection of set items included in the workflow. For instance, pressing of the start key 14, the workflow key 17, or the like in the selection screen DF for the set items may be determined as the input arbitrarily.

When the input for finishing the selection of set items included in the workflow is made, the display control unit 10 controls to display the name input screen D1 for the workflow as illustrated in FIG. 7A. For instance, the user inputs with a software keyboard in the name input screen D1 so as to assign a name of the workflow using alphabet letters or the like. Then, for example, the display control unit 10 grasps contents indicated in a name display column D51 when the next key K31 is pressed as a name to be assigned to the workflow under creation.

When the input of the name to be assigned to the workflow is completed, the display control unit 10 controls the liquid crystal display unit 11 to display the display format determination screen D2 as illustrated in FIG. 7B, for example. The display format determination screen D2 is a screen for determining a display format when the created workflow is called.

For instance, the user presses any key in the display format determination screen D2 among the menu format key K32 (menu display format, details of which will be described later), a short cut type key K33 (list display format, details of which will be described later), a wizard format key K34 (wizard display format, details of which will be described later). The display control unit 10 grasps the display format corresponding to the key when the next key K35 is pressed as the display format of the workflow.

When the selection input of the display format is performed and the next key K35 is pressed, the storage device 92 and the memory 101 store the created workflow (workflow is registered). For instance, the display control unit 10 controls the storage device 92 and the memory 101 to store data indicating a name of the workflow, the display format, the included set items, display order of the set items (that is the same as the selection order of the set items when the workflow is created), a default set value in the set item. When storing in the storage device 92, the display control unit 10 transmits contents of the program to the main body control unit 9, for example, so that the main body control unit 9 control the storage device 92 to store the program.

Note that a template or a workflow registered previously may be used for creating and registering a new workflow. For instance, after the workflow key 17 is pressed and the registration/edit key K36 is pressed in the call screen D3 (see FIG. 8), a template or a workflow is pressed among the workflows displayed on the call screen D3. Then, creation and registration of a new workflow using a template or a workflow registered previously is started.

Note that the template is a workflow that is created by the manufacturer of the multifunction peripheral 100 for each purpose of the workflow by selecting set items considered to be necessary for users and be selected by users. Even if the user is not familiar to operations of the multifunction peripheral 100, the user can easily create the workflow by using the template.

When a new workflow is created and registered by using a template or a workflow registered previously, set items included in the newly created workflow are the same as the set items included in the template or in the workflow registered previously. However, the default set values can be changed, for example. Note that it is possible to adopt a structure in which new set items can be added even in the case where a new workflow is created and registered by using a template or a workflow registered previously.

(Call and Use of Workflow)

Figure 8:
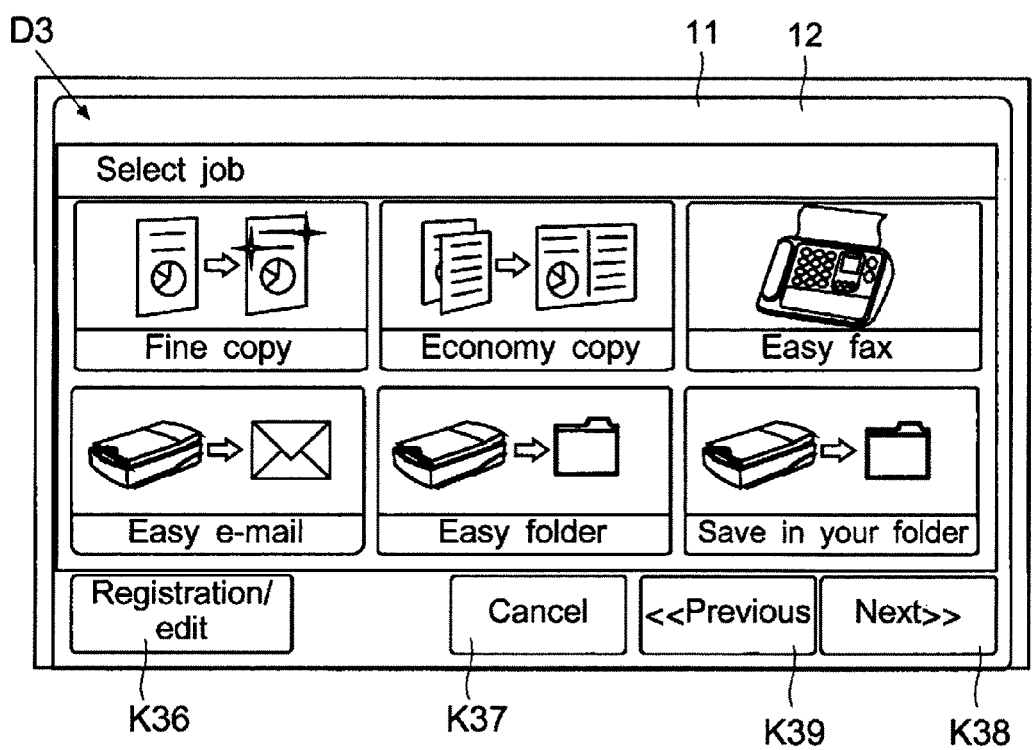
FIG. 8 is an explanatory diagram illustrating an example of a call screen when a workflow is selected according to the embodiment.
Figure 9:
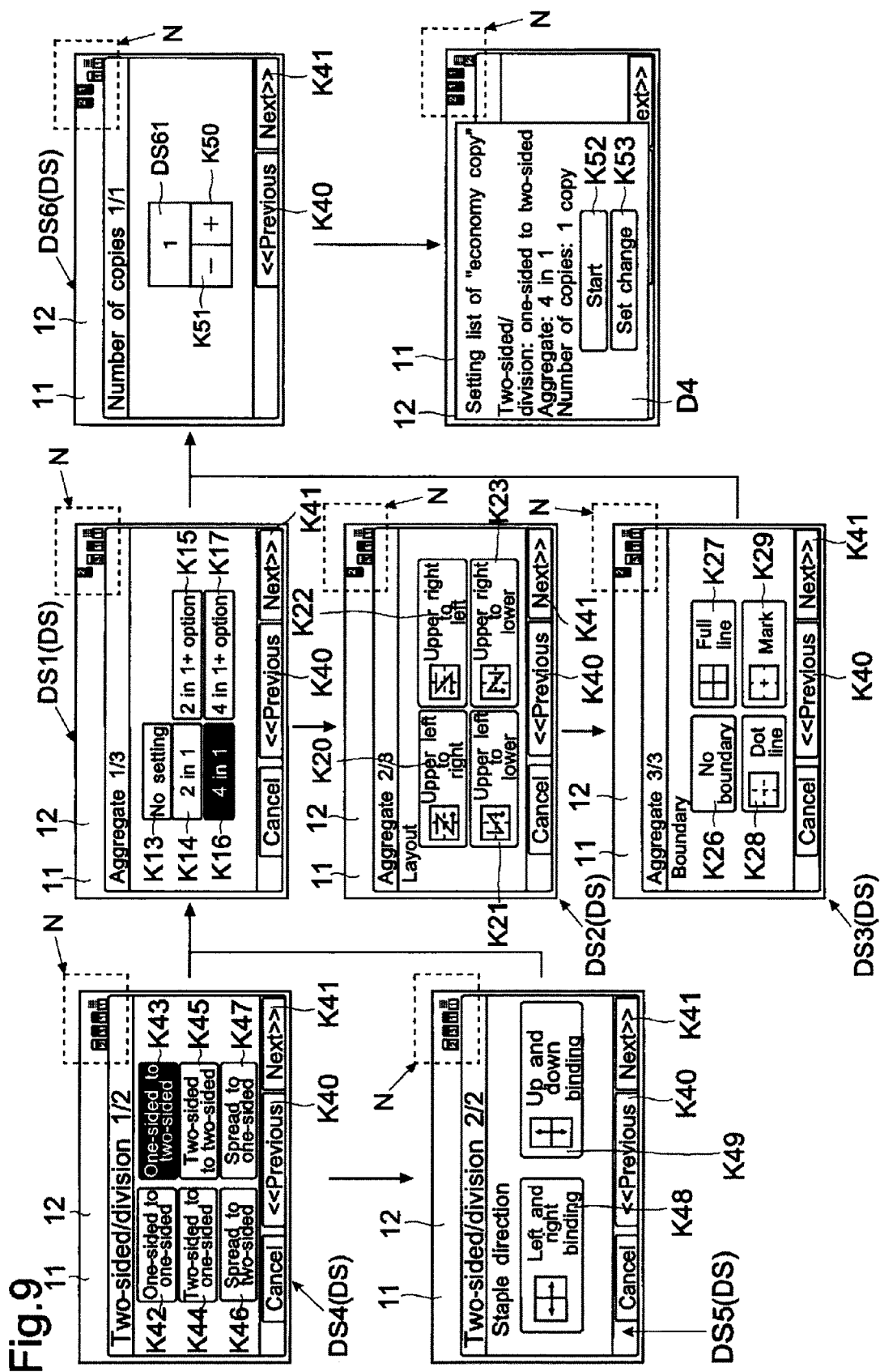
FIG. 9 is an explanatory diagram illustrating an example of a process flow when a workflow is displayed in a wizard format.
Figure 10:
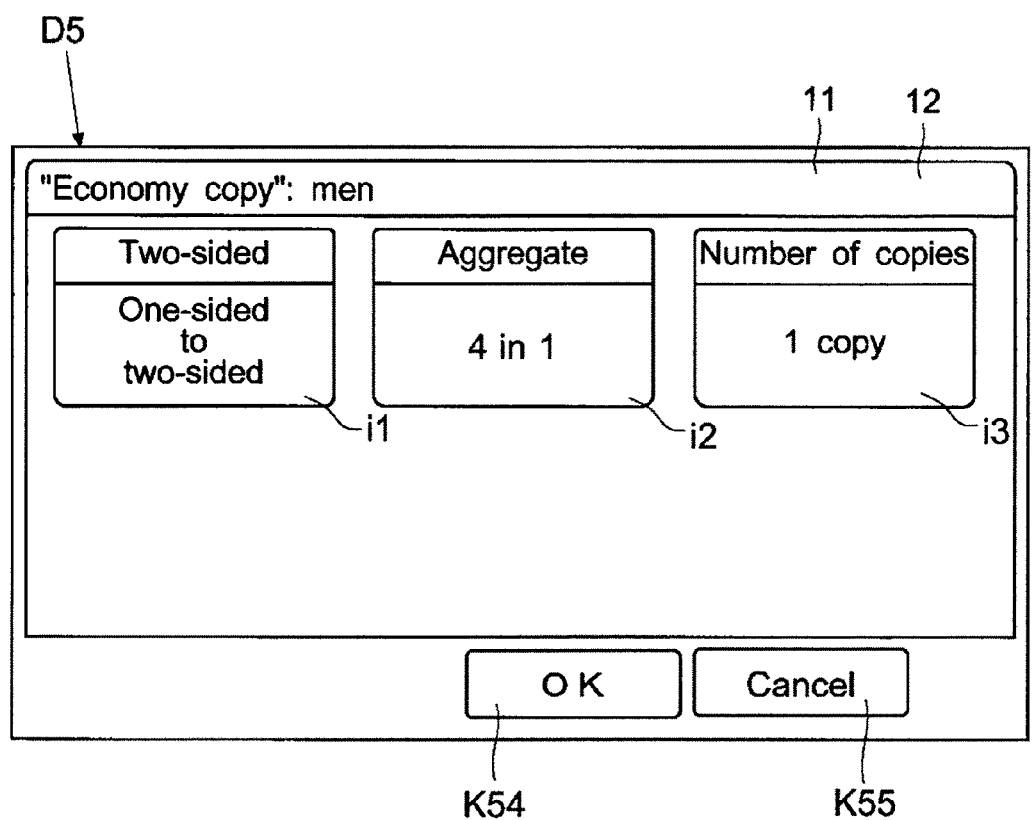
FIG. 10 is an explanatory diagram illustrating an example of a menu screen when the workflow is displayed in a menu format.

Next, with reference to FIGS. 8 to 10, an example of an outline of the workflow, and call and use of the workflow, according to the embodiment of the present invention will be described. FIG. 8 is an explanatory diagram illustrating an example of the call screen D3 when the workflow is selected according to the embodiment of the present invention. FIG. 9 is an explanatory diagram illustrating an example of a process flow when the workflow is displayed in a wizard format. FIG. 10 is an explanatory diagram illustrating an example of a menu screen D5 when the workflow is displayed in a menu format.

For instance, when calling a workflow that is registered in advance, the user presses the workflow key 17 (see FIG. 3). Then, as illustrated in FIG. 8, the call screen D3 for selecting a workflow to be used (called) among the workflows registered in advance is displayed on the liquid crystal display unit 11. For instance, FIG. 8 illustrates an example where images indicating workflows named "fine copy", "economy copy", "easy fax", "easy e-mail", "easy folder", and "save in your folder" are displayed. Then, when the image indicating each workflow is pressed, the pressed workflow is called from the storage device 92 or the memory 101, so that the liquid crystal display unit 11 displays a screen for setting by the workflow.

In addition, below the call screen D3, there is disposed the registration/edit key K36 that is pressed when a new workflow is created or other case. In addition, a cancel key K37 to stop calling the workflow is also disposed. In addition, as illustrated in FIG. 8, there is a limitation of workflows that can be displayed in one screen. Therefore, when the next key K38 is pressed, the display is changed to the call screen D3 of the next page. Then, an image indicating a workflow that is different from that illustrated in FIG. 8 is displayed. In addition, when the previous key K39 is pressed, the call screen D3 of the previous page is displayed.

Next, a display and setting when the workflow is called will be described. Note that there are prepared display formats as screens for setting when the workflow is called, which include a wizard display format in which the set items are displayed one by one in an interactive manner, a list display format in which the set items included in the program are arranged in a list display, and a menu display format in which images indicating the set items included in the program are displayed in one screen. Therefore, an outline of each display format when the workflow is called will be described. Note that, for example, a display example and a setting example of the workflow of "economy copy" including set items of the two-sided print, the aggregate, and the print number of copies will be described.

[Wizard Display Format]

First, with reference to FIG. 9, the wizard display format in the workflow will be described. For instance, FIG. 9 illustrates an example of the workflow in the wizard format when the "economy copy" workflow illustrated in FIG. 8 is called.

This workflow is created and registered so that three set items, for example, "two-sided/division", "aggregate", and "number of copies" are included. In addition, when the workflow is called, set items are displayed in order of "two-sided/division", "aggregate", and "number of copies".

Here, a previous key K40 and a next key K41 are disposed in each setting screen DS. When the previous key K40 is pressed, the liquid crystal display unit 11 displays the previous setting screen DS. In addition, when the next key K41 pressed, the liquid crystal display unit 11 displays the next setting screen DS. The user can set a set value in each set item by pressing a key for setting disposed in each setting screen DS. For instance, as illustrated in FIG. 9, the pressed key for setting is reversed in black and white (displayed in white characters in black background).

Further, when the workflow is created and registered, a default value of the set value that is selected and set in the display of each setting screen DS can be determined. This default value is stored as a part of the workflow in the storage device 92 or the like. For instance, as to the aggregate, in the case where the workflow is created so that the "4 in 1" is the default value, when the setting screen DS1 of "aggregate" is displayed first from the two-sided/division set item, as illustrated in FIG. 9, the 4 in 1 key K16 is displayed in a selected state on the liquid crystal display unit 11.

In the two-sided/division as the first set item, the setting screen DS4 and the setting screen DS5 are prepared. There are arranged on the setting screen DS4 a one-sided to one-sided key K42 that is pressed in the case where the document is a one-side printed and the two-sided printing is not performed, a one-sided to two-sided key K43 that is pressed in the case where the document is one-side printed and the two-sided printing is performed, a two-sided to one-sided key K44 that is pressed in the case where the document is two-side printed and one-sided division printing is performed, a two-sided to two-sided key K45 that is pressed in the case where the document is two-side printed and the one-sided division printing is not performed, a spread to two-sided key K46 that is pressed where two-sided printing of two facing pages is performed, and a spread to one-sided key K47 in the case where the document is a book or the like having two facing pages and the one-sided division printing of the two facing pages on two paper sheets is performed.

There is a case where the division printing of a document cannot be performed without knowing a binding direction of the document. Therefore, for example, when the spread to one-sided key K47 or the spread to two-sided key K46 is pressed and then the next key K41 is pressed, a setting screen DS5 for setting the binding direction of the document is displayed. For instance, a left and right binding key K48 and an up and down binding key K49 are disposed in the setting screen DS5. After the setting screen DS5, when the next key K41 is pressed, or when a key other than the spread to one-sided key K47 and the spread to two-sided key K46 is pressed and the next key K41 is pressed in the setting screen DS4, the setting screen DS1 concerning the aggregate set item is displayed. Note that the set item concerning the aggregate is the same as the case where the workflow is created described above with reference to FIG. 6, so the description is omitted.

Then, when the setting of the aggregate set item is finished, setting screen DS6 concerning the set item of print number of copies is displayed, for example. A print number of copy display section DS61 is disposed in the setting screen DS6. In addition, a plus key K50 and a minus key K51 are disposed below the print number of copy display section DS61. The plus key K50 is pressed when increasing the print number of copies, and the minus key K51 is pressed when decreasing the print number of copies.

After the number of copies is set, when the next key K41 is pressed, the display control unit 10 display a setting list D4 in the liquid crystal display unit 11. The set items included in the workflow and the set values in each set item are displayed in the setting list D4. In addition, a START key K52 and a set change key K53 are displayed on the setting list D4. When the START key K52 is pressed, communication is performed between the display control unit 10 and the main body control unit 9. The main body control unit 9 grasp the contents displayed in the setting list D4 and controls the multifunction peripheral 100 on the basis of the grasped contents to perform copying. When the set change key K53 is pressed, the "two-sided/division" setting screen DS4 is displayed again, for example, so that the user can set the set items included in the workflow again.

[Menu Display Format]

Further, for reference, other display format will be described. First, with reference to FIG. 10, the menu display format in the workflow will be described. For instance, FIG. 10 illustrates an example of the menu screen D5 in the menu display format when the "economy copy" workflow including set items of two-sided/division, aggregate and print number of copies is called.

As illustrated in FIG. 10, in the menu display format, when the "economy copy" workflow is called, for example, the menu image i1 of "two-sided/division", the menu image i2 of "aggregate", and the menu image i3 of "number of copies" (print number of copies) are displayed. Therefore, depending on the selected workflow, menu images displayed on the menu screen D5 are different. Then, in each menu image, the default set value is also displayed. In this way, in the menu display format, the set items included in the workflow is displayed as a menu.

The user presses a menu image of the set item whose set value is to be changed. Thus, the display of the liquid crystal display unit 11 is changed to the setting screen DS for each set item as illustrated in FIG. 9, for example. Then, when the setting in the setting screen DS is finished, the display of the liquid crystal display unit 11 is changed to the menu screen D5 illustrated in FIG. 10, again.

In addition, an OK key K54 and a cancel key K55 are disposed in the menu screen D5. When the OK key K54 is pressed, the setting list D4 illustrated in FIG. 9 is displayed in the liquid crystal display unit 11. Details of the setting list D4 may be the same as the case described above with reference to FIG. 9, so the description thereof is omitted. On the other hand, when the cancel key K55 is pressed, the setting by using the workflow is canceled.

[List Display Format]

Next, with reference to FIG. 9, the list display format in the workflow will be described. In this list display format, when the workflow to be used is selected (pressed) in the call screen D3 illustrated in FIG. 8, the setting list D4 illustrated in FIG. 9 is directly displayed on the liquid crystal display unit 11. When correction of the set value is necessary, the set change key K53 is pressed. Details of the setting list D4 may be the same as the case described above in the wizard display format with reference to FIG. 9, so the description thereof is omitted.

(Navigation Display)

Next, with reference to FIGS. 9 and 11, an example of the navigation image N displayed in the wizard display format on the operation panel 1 according to the embodiment of the present invention will be described. FIGS. 11A to 11D are explanatory diagrams illustrating an example of the navigation image N displayed in the wizard format on the operation panel 1 according to the embodiment of the present invention. Note that the "economy copy" workflow is exemplified in this description too (the workflow that includes set items of two-sided/division, aggregate, and number of copies, and when it is called, the set items of two-sided/division, aggregate, and number of copies are displayed in this order).

When the display format of the called workflow is the wizard format, the display control unit 10 controls the liquid crystal display unit 11 to display the navigation image N for the setting in the workflow on the right corner of the liquid crystal display unit 11 of this embodiment, for example, as illustrated with the enclosing broken line in FIG. 9. The navigation image N is an image for informing the user about an overview of the workflow, the current position (progress), and the number of setting screens DS in each set item.

Note that in the example illustrated in FIG. 9 or the like, the display control unit 10 controls the liquid crystal display unit 11 to display the navigation image N at the upper right corner part thereof. However, the navigation image N may be displayed at the upper left corner part, the lower left corner part, or the lower right corner part without limiting to the upper right corner part, as long as there is a display space. In addition, the display control unit 10 may display the navigation image N at a part except the corner portions, and the display position of the navigation image N may be determined arbitrarily.

Figure 11A:
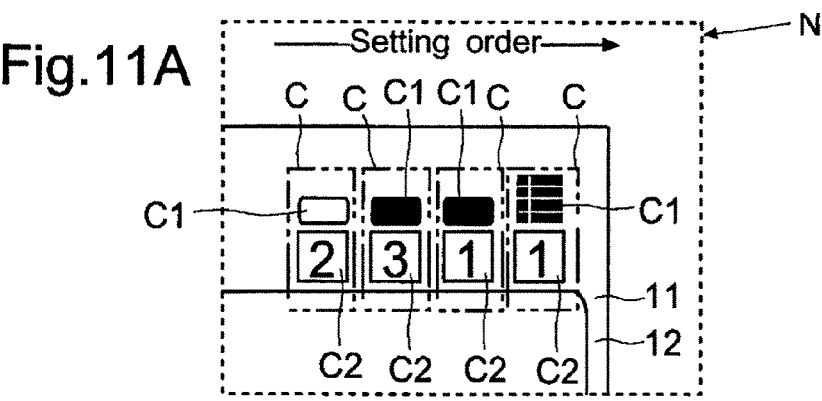
FIGS. 11A to 11D are explanatory diagrams illustrating examples of navigation images displayed when the display is performed in the wizard format on the operation panel according to the embodiment.
Figure 11B:
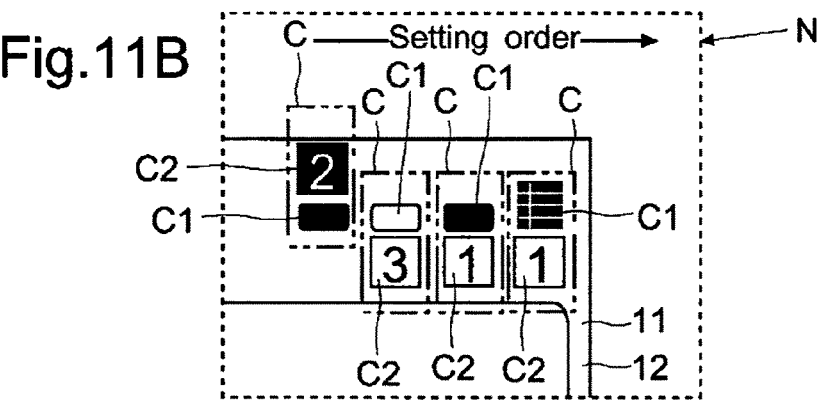
Figure 11C:
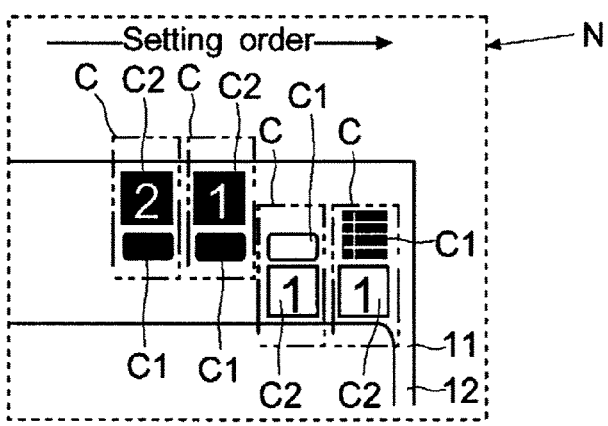
Figure 11D:
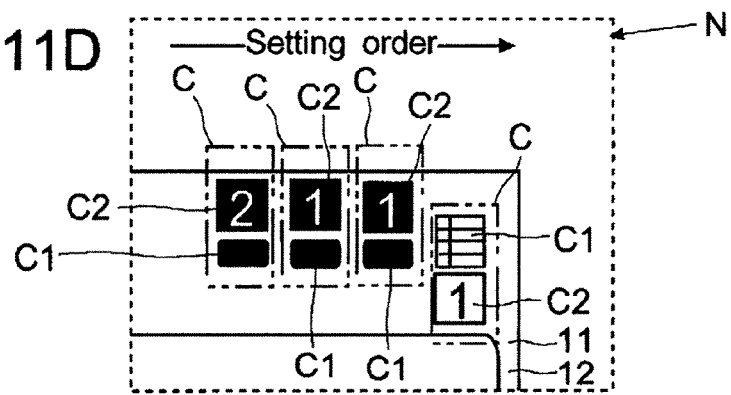

FIGS. 11A to 11D are enlarged diagrams of the broken line parts in FIG. 9. FIG. 11A illustrates an example of the navigation image N in which the workflow is called and the set item of two-sided/division is being set. FIG. 11B illustrates an example of the navigation image N in which the workflow is called and the set item of aggregate is being set. FIG. 11C illustrates an example of the navigation image N in which the workflow is called and the set item of number of copies is being set. FIG. 11D illustrates an example of the navigation image N in which the workflow is called and the setting list D4 is displayed.

Note that in the set item of two-sided/division or aggregate, a plurality of setting screens DS are prepared. However, while one set item is being set, the display control unit 10 controls to display the same navigation image N in the setting screens DS. In other words, the display control unit 10 changes the navigation image N when setting of one set item is finished. Therefore, only one type of the navigation image N is displayed while the set item of two-sided/division or aggregate is being set.

As being illustrated in FIGS. 11A to 11D, the navigation image N of each stage includes a plurality of combination images C. In other words, the navigation image N is a set of the combination images C. Each of the combination images C is one set of images in which a plurality of images are combined. Specifically, each of the combination images C is constituted of a block-like position display image C1 and a screen number display image C2.

In addition, each combination image C corresponds to the set item included in the workflow. In addition, the combination images C are displayed in a lateral arrangement in the order in which they are displayed in the workflow. Specifically, the combination image C disposed closest to the left among the combination images C illustrated in FIGS. 11A to 11D corresponds to the set item of two-sided/division, and the combination image C disposed at the second position from the left corresponds to the set item of aggregate, and the combination image C disposed at the third position from the left corresponds to the set item of the print number of copies.

Here, the combination image C disposed closest to the right end (the last end of the arranged combination images C) corresponds to the setting list D4. In other words, each workflow includes a set completion function as one of set items, for accepting an input of completion of setting in the program (workflow). Then, liquid crystal display unit 11 displays the combination image C indicating the set item of set completion function among the combination images C at the end position. In other words, the program (workflow) includes the set completion function for accepting an input of completion of setting in the program as one of the set items, and the display unit (liquid crystal display unit 11) displays the combination image C indicating the set item of set completion function at the end position of the combination image C indicating the set items arranged and displayed when the program is called.

In each diagram of FIGS. 11A to 11D, the position display image C1 is a substantially rectangular figure that does not include a numeral among the combination images C. On the other hand, the screen number display image C2 is a substantially rectangular figure that includes a numeral among the combination images C. Note that the position display image C1 and the screen number display image C2 are merely examples, and so they may be other figures such as a circle, an ellipse, a polygon, a pattern, a figure or other shapes, which can be determined arbitrarily.

Here, among the position display images C1, the position display image C1 on the right end position corresponding to the setting list D4 (set item of set completion function) is different from the position display image C1 corresponding to other set items. For instance, in FIG. 11, as to the position display image C1 at the right end position corresponding to the set item of set completion function, the setting list D4 is displayed. Therefore, a figure like a list is displayed. In other words, the display unit (liquid crystal display unit 11) displays the position display image C1 of the combination image C indicating the set item of set completion function differently from the position display image C1 of other combination images C. Thus, the user can easily grasp which one of the combination images C arranged and displayed indicates the final set item. In addition, the user can confirm how many set items remaining until setting completion and how many set items have been set by viewing the combination images C arranged and displayed.

The display control unit 10 controls the liquid crystal display unit 11 to display the position display image C1 corresponding to the set item that is currently displayed (being set) among the position display images C1 in a manner different from that of other position display images C1. In the example illustrated in FIG. 11, the liquid crystal display unit 11 displays the position display image C1 corresponding to the set item that is currently being displayed (being set) in a bright manner and displays the position display image C1 corresponding to other set items in a dark manner. Note that they may be displayed oppositely about the bright and dark manners, or the current position may be displayed by changing color of the position display image C1. For instance, the liquid crystal display unit 11 may change display colors in such a manner that the position display image C1 corresponding to the set item that is currently being displayed is displayed in blue or green color while the position display image C1 corresponding to the set item that is not displayed is displayed in red. In other words, the display unit (liquid crystal display unit 11) displays the position display image C1 of the combination image C corresponding to the set item that is being displayed and the position display image C1 of the combination image C corresponding to the set item that is not being displayed in different manners. In addition, the display unit displays the position display image C1 of the combination image C corresponding to the set item that is being displayed and the position display image C1 of the combination image C corresponding to the set item that is not being displayed in different brightness or in different display colors.

Therefore, in the case of FIG. 11A, the liquid crystal display unit 11 displays the position display image C1 disposed closest to the left end corresponding to the set item of two-sided/division in highest brightness. Then, in the case of FIG. 11B, the liquid crystal display unit 11 displays the position display image C1 disposed at the second position from the left corresponding to the set item of aggregate in highest brightness. In addition, in the case of FIG. 11C, the liquid crystal display unit 11 displays the position display image C1 disposed at the third position from the left corresponding to the set item of number of copies in highest brightness. In addition, in the case of FIG. 11D, the liquid crystal display unit 11 displays the position display image C1 disposed closet to the right end corresponding to the set item of set completion function in highest brightness.

On the other hand, the screen number display image C2 indicates the number of setting screens DS displayed when setting the set item as for set items that have not been set. In other words, the display unit (liquid crystal display unit 11) displays the number of setting screens DS that can be displayed in setting as the screen number display image C2 corresponding to set items that has not been set.

Therefore, as illustrated in FIG. 11A or the like, when the set item of two-sided/division is set, for example, two (types of) setting screens DS can be displayed (see FIG. 10). Therefore, the liquid crystal display unit 11 displays numeral "2" as the screen number display image C2 that is disposed closest to the left end corresponding to two-sided/division. In addition, when the set item of aggregate is set, for example, three (types of) setting screens DS can be displayed (see FIGS. 6 and 10). Therefore, the liquid crystal display unit 11 displays numeral "3" as the screen number display image C2 disposed at the second position from the left corresponding to aggregate. In addition, when the set item of number of copies is set, for example, one (type of) setting screen DS is displayed (see FIG. 10). Therefore, the liquid crystal display unit 11 displays numeral "1" as the screen number display image C2 disposed at the third position from the left corresponding to number of copies. In addition, when the set item of set completion function is set, for example, one setting list D4 is displayed (see FIG. 10). Therefore, the liquid crystal display unit 11 displays numeral "1" as the screen number display image C2 disposed at the set item of set completion function. Thus, the user can grasp the number of setting screens DS that can be displayed in the set item that has not been set. Therefore, the user can grasp correctly an overview of the program or the current progress position in the program.

Further, FIG. 11B illustrates an example of the navigation image N when the second set item (of aggregate) is being set after the first set item (of two-sided/division) has been set in the called workflow. FIG. 11C illustrates an example of the navigation image N when the third set item (of number of copies) is being set after the second set item (of aggregate) has been set in the called workflow. FIG. 11D illustrates an example of the navigation image N when the fourth (final) set item (of set completion) is being set after the third set item (of number of copies) has been set in the called workflow.

As illustrated in FIGS. 11B to 11D, the position display image C1 corresponding to the set item that is being set is displayed brighter than other position display images C1. Thus, the user can grasp an overview in setting the workflow about what number of set item is being set currently among the all set items or how many set items remain to be set.

In addition, as illustrated in FIGS. 11B to 11D, the screen number display image C2 of the set item that has been set is displayed at a different position in a different form from the screen number display image C2 of the set item that has not been set. For instance, the screen number display image C2 corresponding to the set item that has been set is displayed in a form of white characters in a filled background image above the position display image C1. In other words, the display unit (liquid crystal display unit 11) arranges and displays the screen number display image C2 corresponding to the set item that has not been set and the screen number display image C2 corresponding to the set item that has been set in different directions with respect to the position display image C1. Thus, the user can distinguish easily whether the screen number display image C2 indicates the number of setting screens DS of the set item that has not been set or the number of setting screens DS of the set item that has been set.

In addition, the screen number display image C2 corresponding to the set item that has been set indicates the number of setting screens DS that are displayed in real setting. In other words, the display unit (liquid crystal display unit 11) displays a number indicating the number of setting screens DS that are actually displayed as the screen number display image C2 corresponding to the set item that has been set.

For instance, with reference to FIG. 11D, numeral "2" is displayed in the screen number display image C2 corresponding to the set item of two-sided/division. In the set item of two-sided/division, the liquid crystal display unit 11 indicates that two setting screens DS are displayed.

In addition, numeral "1" is displayed in the screen number display image C2 corresponding to the set item of aggregate. In the set item of aggregate, the 2 in 1 key K15 or the 4 in 1 key K17 is not pressed, and the liquid crystal display unit 11 indicates that only one setting screen DS is displayed.

In addition, numeral "1" is displayed in the screen number display image C2 corresponding to the set item of number of copies for which only one setting screen DS is prepared originally. It indicates that only one setting screen DS is displayed.

In this way, the navigation image N constituted of a plurality of combination images C varies when setting is performed in the workflow. Thus, the user can grasp the current position and progress in the workflow on the basis of the position display image C1. In addition, the user can know the number of the setting screens DS of the set item that is not set and the number of setting screens DS that are actually displayed in the set item that has been set on the basis of the screen number display image C2. Thus, the user can grasp a workload until the workflow has been set and approximate necessary time of the same.

(Display Control of Navigation Image N)

Figure 12:
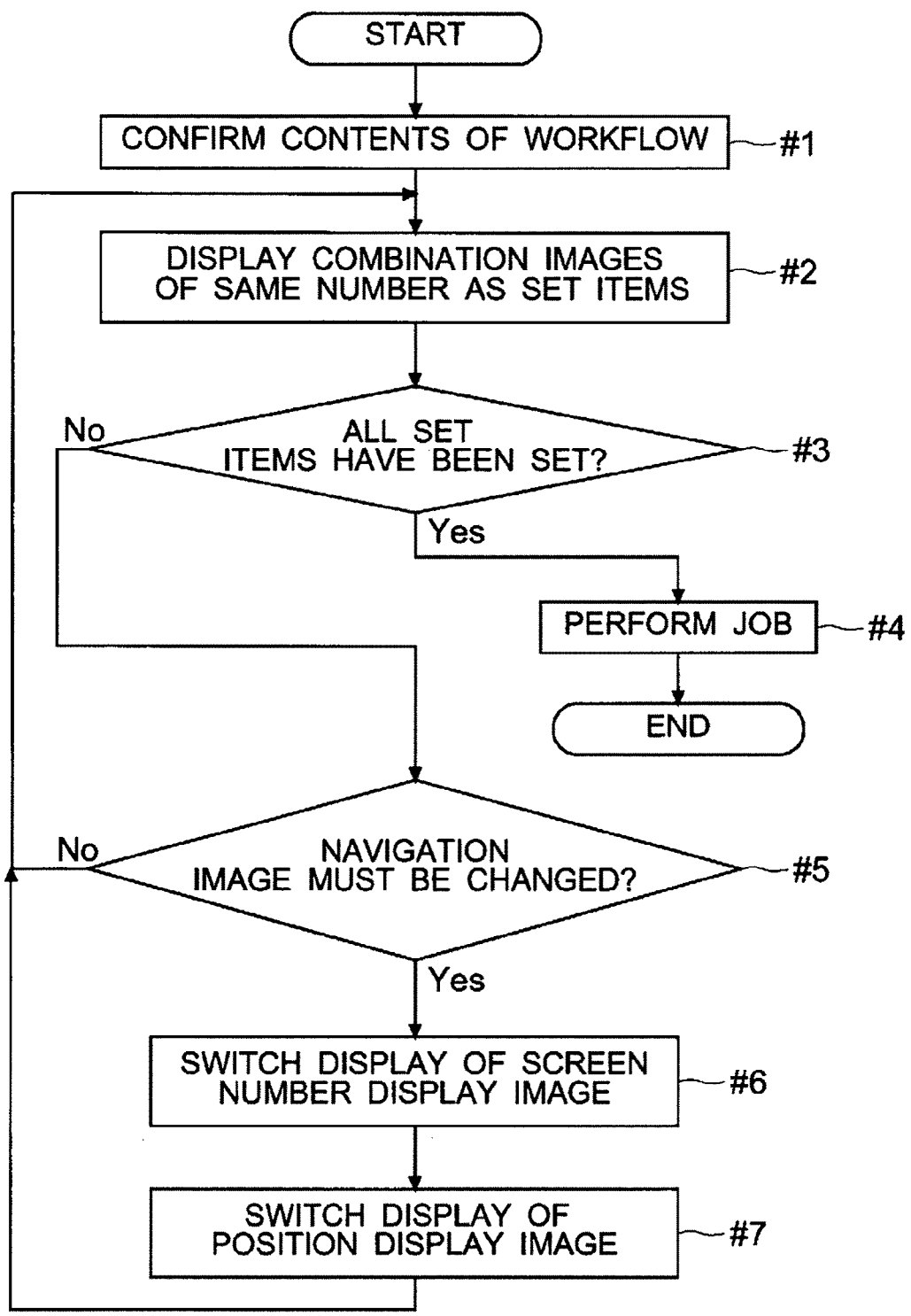
FIG. 12 is a flowchart illustrating an example of display control of the navigation image according to the embodiment.

Next, with reference to FIG. 12, an example of display control of the navigation image N in the multifunction peripheral 100 according to the embodiment of the present invention will be described. FIG. 12 is a flowchart illustrating an example of display control of the navigation image N according to the embodiment of the present invention.

First, the process flow illustrated in FIG. 12 starts when the display control unit 10 recognizes that the workflow key 17 (see FIG. 3) is pressed and that the workflow to be used (called) is selected among the workflows registered in advance via the touch panel unit 12, and, when the display format of the workflow is the wizard display format.

Next, the display control unit 10 confirms contents of the workflow registered as a program in the storage device 92 or the memory 101 (Step #1). Then, the display control unit 10 displays combination images C of the same number as the set items (including the set completion function) on the liquid crystal display unit 11 (Step #2). For instance, when the workflow is called, the liquid crystal display unit 11 displays the position display image C1 of the first (leading) combination image C brightly as illustrated in FIG. 11A. In addition, the liquid crystal display unit 11 displays the screen number display image C2 indicating the number of setting screens that can be displayed in the set item below every position display image C1.

In other words, the display input device (operation panel 1) includes the display unit (liquid crystal display unit 11) that displays a plurality of types of functions that can be performed as the set item, the storage unit (storage device 92 or memory 101) that stores a program for controlling the display unit (liquid crystal display unit 11) to display the screen for setting the set item selected and registered in advance by calling, which is a combination of set items selected and registered in advance from a plurality of set items, and the input unit (touch panel unit 12 or the like) that accepts a program call and a setting input performed on the display input device. The display unit (liquid crystal display unit 11) displays the combination image C of the position display image C1 for indicating whether or not being displayed in the program when the program is called and indicating the current position, and the screen number display image C2 indicating the number of setting screens DS that are displayed or have been displayed for setting the set item included in the program, for each set item included in the program, arranged in the display order of the set item in the program.

Next, the display control unit 10 checks whether or not all the set items (including the set item of set completion function) included in the workflow have been set (Step #3). Note that switching of the setting screen DS and the like can be performed between Step #2 and Step #3. For instance, the display control unit 10 checks whether or not the START key K52 in the setting list D4 is pressed.

When all the set items have been set (Yes in Step #3), for example, the display control unit 10 transmits the data indicating the setting performed in the workflow to the main body control unit 9, and the main body control unit 9 performs a job on the basis of the received data indicating the setting (Step #4). For instance, when the aggregate print is set, the main body control unit 9 controls the image forming unit 6, the image processing unit 94 and the like so that the multifunction peripheral 100 performs aggregate print. In addition, for example, when the image data transmission is set, the main body control unit 9 controls the I/F unit 93 and the like to transmit the image data to the set destination on the basis of the image data obtained by reading the document with the image reader unit 3. After Step #4, this control should be finished.

On the other hand, when all the set items are not set in the workflow (No in Step #3), the display control unit 10 checks whether or not it is necessary to change the navigation image N (Step #5). For instance, the display control unit 10 recognizes that the change is necessary in the case one set item has been set so as to change to the next set item when a certain key (e.g., next key K41) is pressed, or the case where the previous key K40 is pressed so as to go back to the previous set item.

When there is no necessity of changing the navigation image N (No in Step #5), the process goes back to Step #2, for example. Note that switching of the setting screen DS or the like is performed between Step #5 and Step #2.

On the other hand, when it is necessary to change the navigation image N (Yes in Step #5), for example, the display control unit 10 controls the liquid crystal display unit 11 so switch the display position of the screen number display image C2, like changing the display position of the screen number display image C2 of the set item that has been set (Step #6). In addition, for example, the display control unit 10 controls the liquid crystal display unit 11 to switch the display of the position display image C1, like brightening the position display image C1 corresponding to the next set item of the set item that has been set (Step #7). Then, for example, the process goes back to Step #2, in which the same navigation image N is displayed until one set item has been set.

In this way, the present invention can also be regarded as an invention of a display method of the display input device (e.g., operation panel).

Although the embodiment of the present invention is described above, the scope of the present invention is not limited to this description, but the present invention can be embedded with various modification within the scope of the invention without deviating from the spirit of the present invention.

What is claimed is:

1. A display input device comprising:
a storage unit which stores a workflow for displaying a screen for setting a set item that is selected and registered in advance, the workflow being a combination of set items selected and registered in advance from a plurality of set items;
an input unit which accepts
an input for creation of the workflow by a user,
as input for selecting a set item during creation of the workflow by the user,
an input for determining, during creation of the workflow, a display format of the workflow used when the workflow is called, out of a plurality of display formats including a wizard format and a list display format,
a call of the workflow, and
a setting input performed on the device; and
a display unit which displays a plurality of functions that can be performed as the set items and which, when the workflow is called in a wizard format, displays setting screens for the set items registered in the workflow in an order selected by the user during creation of the workflow and in an interactive manner, with a previous key and a next key arranged on each setting screen so that pressing the previous key causes a sequentially previous setting screen to be displayed and that pressing the next key causes a sequentially next setting screen to he displayed,
the display unit displaying, on each setting screen, a navigation screen which includes a plurality of combination images and which serves to inform the user of an overview of the workflow, a current position, and the number of setting screens in each set item,
the display unit displaying, for each set item included in the workflow, one of the combination images, and displaying as the navigation image, the plurality of combination images arranged in the order selected by the user during the creation of the workflow, each combination image including a position display image for indicating whether or not a set item is being displayed in the workflow and for indicating a current position, and a screen number display image for indicating the number of setting screens that are displayed or have been displayed for setting each set item included in the workflow, wherein
the workflow includes a set completion function for accepting an input of completion of setting in the workflow as one of the set items, and
the display unit displays, at an end position of the plural combination images when the workflow is called in the wizard format, a combination image that indicates the set item of a set completion function and that comprises a figure like a list displayed when the workflow is displayed in the list display format.

2. The display input device according to claim 1, wherein the display unit displays differently the position display image of the combination image corresponding to a set item that is being displayed, and the position display image of the combination image corresponding to a set item that is not being displayed.

3. The display input device according to claim 2, wherein the display unit displays the position display image of the combination image corresponding to the set item that is being displayed, and the position display image of the combination image corresponding to the set item that is not being displayed, in different brightness levels or in different display colors.

4. The display input device according to claim 1, wherein the display unit displays the number of setting screens that can be displayed in setting as the screen number display image corresponding to a set item that has not been set.

5. The display input device according to claim 1, wherein the display unit displays a numeral indicating the number of setting screens that are actually displayed in the setting of a set item that has been set.

6. The display input device according to claim 1, wherein the display unit displays the screen number display image corresponding to a set item that has not been set and the screen number display image corresponding to a set item that has been set, in different directions with respect to the position display image.

7. The display input device according to claim 1, wherein the display unit displays the position display image of the combination image indicating the set item of the set completion function differently from the position display image of other combination images.

8. An image forming apparatus comprising the display input device according to claim 1.

9. The display input device according to claim 1, wherein
the position display image comprises a figure without a numeral or a character, and
the screen number display image comprises a figure that includes only a numeral.

10. A display method for a display input device, comprising the steps of:
storing a workflow for displaying a screen for setting a set item that is selected by calling the workflow in wizard format, the workflow being a combination of set items selected in advance from a plurality of set items, wherein the workflow includes a set completion function for accepting an input of completion of setting in the workflow as one of the set items;
accepting an input for creation of the workflow by a user, an input for selecting a set item during creation of the workflow by the user, an input for determining, during creation of the workflow, a display format of the workflow used when the workflow is called out of a plurality of display formats including a wizard format and a list display format, a call of the workflow, and a setting input performed on the device;
displaying a plurality of types of functions that can be performed as the set items and which, when the workflow is called in a wizard format, display setting screens for the set items registered in the workflow in an order selected by the user during creation of the workflow and in an interactive manner, with a previous key and a next key arranged on each setting screen so that pressing the previous key causes a sequentially previous setting screen to be displayed and that pressing the next key causes a sequentially next setting screen to be displayed;
displaying, on each setting screen, a navigation screen which includes a plurality of combination images and which serves to inform the user of an overview of the workflow, a current position, and the number of setting screens in each set item;
displaying for each set item included in the workflow, one of the combination images, and displaying as the navigation image the plurality of combination images arranged in the order selected by the user during the creation of the workflow with one combination image for each set item included in the workflow and with the plurality of combination images, each combination image including a position display image for indicating whether or not a set item is being displayed in the workflow and for indicating a current position, and a screen number display image for indicating the number of setting screens that are displayed or have been displayed for setting a set item included in the workflow; and displaying, at an end position of the plural combination images when the workflow is called in the wizard format, a combination image that indicates the set item of a set completion function and that comprises a figure like a list displayed when the workflow is displayed in the list display format.

11. The display method for a display input device according to claim 10, wherein the position display image of the combination image corresponding to a set item that is being displayed, and the position display image of the combination image corresponding to a set item that is not being displayed are displayed in different manners.

12. The display method for a display input device according to claim 11, wherein the display unit displays the position display image of the combination image corresponding to the set item that is being displayed, and the position display image of the combination image corresponding to the set item that is not being displayed, in different brightness levels or in different display colors.

13. The display method for a display input device according to claim 10, wherein the number of setting screens that can be displayed in setting is displayed as the screen number display image corresponding to a set item that has not been set.

14. The display method for a display input device according to claim 10, comprising displaying a numeral indicating the number of setting screens that are actually displayed in the setting of a set item that has been set.

15. The display method for a display input device according to claim 10, wherein the screen number display image corresponding to a set item that has not been set and the screen number display image corresponding to a set item that has been set are displayed in different directions with respect to the position display image.

16. The display method for a display input device according to claim 10, wherein the position display image of the combination image indicating the set item of the set completion function is displayed differently from the position display image of other combination images.

17. The display method for a display input device according to claim 10, wherein the position display image comprises a figure without a numeral or character, and the screen number display image comprises a figure that includes only a numeral.

* * * * *